US012724908B2

(12) United States Patent
Dou et al.

(10) Patent No.: US 12,724,908 B2
(45) Date of Patent: Sep. 1, 2026

(54) FILE MIGRATION METHOD, ELECTRONIC DEVICE , AND STORAGE MEDIUM

(71) Applicant: HONOR DEVICE CO., LTD., Shenzhen (CN)

(72) Inventors: Weiming Dou, Shenzhen (CN); Jianwu Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/570,483

(22) PCT Filed: Sep. 15, 2022

(86) PCT No.: PCT/CN2022/119111

§ 371 (c)(1),
(2) Date: Dec. 14, 2023

(87) PCT Pub. No.: WO2023/077975

PCT Pub. Date: May 11, 2023

(65) Prior Publication Data

US 2024/0281549 A1 Aug. 22, 2024

(30) Foreign Application Priority Data

Nov. 4, 2021 (CN) ......................... 202111300248.6

(51) Int. Cl.
*G06F 21/62* (2013.01)
*G06F 16/11* (2019.01)

(52) U.S. Cl.
CPC ........ *G06F 21/6218* (2013.01); *G06F 16/119* (2019.01)

(58) Field of Classification Search
None
See application file for complete search history.

(56) References Cited

U.S. PATENT DOCUMENTS 8,997,248 B1 * 3/2015 McKay ................... G06F 21/62 726/27
10,277,601 B1 * 4/2019 Higgins .............. G06F 21/6218
(Continued)

FOREIGN PATENT DOCUMENTS

CN 104657674 A 5/2015
CN 105912951 A 8/2016
(Continued)

OTHER PUBLICATIONS

No stated author; Secure Folder User Guide; 2021; Retrieved from the Internet https://web.archive.org/web/20210924011809/https://docs.samsungknox.com/secure-folder/Content/secure-folder-overview.htm; pp. 1-29, as printed. (Year: 2021).*
(Continued)

*Primary Examiner* — Michael W Chao
(74) *Attorney, Agent, or Firm* — Fish & Richardson P.C.

(57) ABSTRACT

A main space, a private space, and a first application are disposed on an electronic device, and a filesystem of the electronic device is a filesystem in user space. A file migration method includes: receiving a first access request of the first application for a first-type file, where a space running the first application is the private space; if it is determined that the first application has a read and write permission on the first-type file, redirecting a content provider corresponding to the first-type file from a second content provider in the private space to a first content provider in the main space; and receiving a first migration request of the first application for a first specified file in the first-type file, where the first migration request is used to request to migrate the first specified file from the main space to the private space.

20 Claims, 24 Drawing Sheets

(56) References Cited

U.S. PATENT DOCUMENTS 11,941,139 B2* 3/2024 Mika .................. G06F 21/6218
2004/0117836 A1* 6/2004 Karaoguz .......... H04N 21/2343
725/135
2004/0210796 A1* 10/2004 Largman ............. G06F 11/1469
714/E11.133
2009/0046858 A1* 2/2009 Iyer ......................... G06F 21/85
380/259
2011/0252232 A1* 10/2011 De Atley .............. G06F 16/162
713/165
2011/0252243 A1* 10/2011 Brouwer ................. G06F 21/62
713/189
2013/0275548 A1* 10/2013 Molaro ................... G06F 16/13
709/217
2015/0169880 A1 6/2015 Kim
2015/0261972 A1* 9/2015 Lee ......................... H04L 9/088
713/165
2016/0285958 A1 9/2016 Das et al.
2016/0292443 A1* 10/2016 von Muhlen ......... H04L 63/104
2016/0300079 A1* 10/2016 Gong ...................... G06F 16/16
2017/0091182 A1* 3/2017 Wurster ................ G06F 21/604
2017/0262655 A1* 9/2017 Runkis .................... H04L 63/18
2017/0277395 A1* 9/2017 Suo ..................... G06F 3/04817
2017/0300260 A1 10/2017 Lv et al.
2018/0239555 A1 8/2018 Cao et al.
2018/0239930 A1* 8/2018 Lai ....................... H04N 23/667
2019/0220528 A1* 7/2019 Cruciani ............... G06F 16/174
2021/0042002 A1* 2/2021 Lee ....................... G06F 3/0481
2022/0342850 A1 10/2022 Cao et al.

FOREIGN PATENT DOCUMENTS

CN 106844464 A 6/2017
CN 107636612 A 1/2018
CN 108229203 A 6/2018
CN 108573161 A 9/2018
CN 107003950 B 12/2020
CN 113157231 A 7/2021
CN 113495869 A 10/2021
WO 2021083378 A1 5/2021

OTHER PUBLICATIONS

Cipriani; what you need to know about note 7 . . . ; 2016; Retrieved from the Internet https://www.cnet.com/tech/mobile/what-you-need-to-know-about-the-note-7s-secure-folder/; pp. 1-12, as printed. (Year: 2016).*

Yong et al., “Behavioral Model Construction Method for Mobile Applications Based on Small Code,” Computer Science, Nov. 15, 2015, 15 pages (with English abstract).

* cited by examiner

FIG. 5E
100
5G 5G
8:00
550
2:57
Monday, September 6
July 30, Xinchou
551
Notepad
Calculator
Settings
Gallery
Jan
15
Email
Clock
Calendar
Weather
Videos
Music
Recorder
File management

FIG. 9E
100
950
951
5G 5G
8:00
2:58
Monday, September 6
July 30, Xinchou
Notepad
Calculator
Settings
Gallery
Jan
15
Email
Clock
Calendar
Weather
Videos
Music
Recorder
File management

FILE MIGRATION METHOD, ELECTRONIC DEVICE , AND STORAGE MEDIUM

CROSS-REFERENCE TO RELATED APPLICATIONS

This application is a national stage of International Application No. PCT/CN2022/119111, filed on Sep. 15, 2022, which claims priority to Chinese Patent application Ser. No. 20/211,1300248.6, filed on Nov. 4, 2021. The disclosures of both of the aforementioned applications are hereby incorporated by reference in their entireties.

TECHNICAL FIELD

The present invention relates to the field of intelligent terminal technologies, and specifically, to a file migration method, an electronic device, and a storage medium.

BACKGROUND

With development of the field of intelligent terminal technologies, to meet people's requirements, a terminal electronic device provides a multi-user mechanism. To be specific, a plurality of user spaces may be disposed on one electronic device, and data, applications, and the like in the user spaces are independent. For example, one main space and one private space are disposed on a mobile phone used by a user. The user may usually log in to a main space user to conduct social activities, data sending, file processing, and other matters, and the user may further store some private data, private files, and the like in the private space. In this way, the user can view the private data or files by logging in to the private space, but cannot view the private data or files in the private space when logging in to the main space.

However, in an operating system currently used by an electronic device, for example, in a system of the Android (Android) 11.0 version or a later version, a filesystem in user space (Filesystem in User Space, FUSE) with a stronger filesystem management and control capability is used, and the FUSE distinguishes users for external storage of the electronic device, to be specific, a user of each space can access only stored data or a stored file under a current space user name. For example, when logging in to the main space, the user can access only data or a file under a main space user name, and when logging in to the private space, the user can access only data or a file under a private space user name. As a result, when the user logs in to the private space, if the user wants to migrate some data or files (for example, photos or videos) in the main space to the private space for privacy protection, the user cannot complete a file migration process because the user cannot access the data or the files in the main space from the private space. Consequently, it is inconvenient for the user to use the private space, and user experience is poor.

SUMMARY

Embodiments of this application provide a file migration method, an electronic device, and a storage medium. Through redirection of a content provider, on an electronic device to which a FUSE filesystem is applied, when a user performs an authorized file migration operation in a private space, if the file migration operation needs to access a file or a file storage path in a main space, the user can redirect to a content provider of a u0 user to obtain an access and write permission on a file in the main space, thereby completing a process of migrating a file in the main space to the private space or migrating a file in the private space to the main space. In the redirection processing in the solution in this application, when the user performs an authorized file migration operation in the main space, if the file migration operation needs to access a file or a file storage path in the private space, the user can redirect to a content provider of a u10 user to obtain an access and write permission on a file in the private space, thereby completing a process of migrating a file in the main space to the private space or migrating a file in the private space to the main space. Based on the solution in this application, the electronic device to which the FUSE filesystem is applied can also meet a file migration requirement of a user without affecting security management performance of the FUSE filesystem, thereby improving user experience.

According to a first aspect, an embodiment of this application provides a file migration method applied to an electronic device. A main space, a private space, and a first application are disposed on the electronic device, and a filesystem of the electronic device is a filesystem in user space. The method includes: receiving a first access request of the first application for a first-type file in the main space, where a space running the first application is the private space; when determining that the first application has a read permission on the first-type file in the main space, redirecting, in response to the first access request, a content provider corresponding to the first-type file from a second content provider in the private space to a first content provider in the main space, where the first content provider is used by the first application to obtain the first-type file: receiving a first migration request of the first application for a first specified file in the first-type file in the main space, where the first migration request is used to request to migrate the first specified file from the main space to the private space; and in response to the first migration request. migrating the first specified file from the main space to the private space when determining that the first application has a read and write permission on the first-type file in the main space.

In other words, after the first application running in the private space has the read and write permission on the first-type file in the main space, the first-type file may be read from the main space, and then written into the private space, and the first-type file may also be deleted from the main space. It may be understood that, in the context description of this application, unless otherwise specified, descriptions of "reading" a file and "accessing" a file are equivalent, descriptions of a "read and write permission" and a "migration permission" are also equivalent. Details are not described again below:

It may be understood that the read and write permission is, for example, the migration permission described in the following embodiment. To be specific, when the private space is a space specified to enable the migration permission and the first application that performs a file migration operation is also an application authorized to enable the migration permission, if the first application running in the private space requests to access the first-type file in the main space, the system of the electronic device may redirect the content provider corresponding to the first-type file from the originally default second content provider in the private space to the first content provider in the main space, so as to obtain a permission to access the first-type file in the main space. In this case, the electronic device may display a file list of the first-type file in the main space for a user to perform selection. After the user selects the first specified file that needs to be migrated, the system of the electronic device may obtain the first specified file based on the redirected first content provider in the main space, and migrate the first specified file to the private space. For example, as shown in FIG. 5B in the following embodiment, when the user selects a file of a picture 521 type in an operating interface 520 displayed on the electronic device for access. an Activity manager service of the electronic device performs redirection processing to obtain the first content provider in the main space to access a picture file in the main space, so that the user can select, in a picture selection interface 530 shown in FIG. 5C in the following, a picture file that needs to be migrated to complete a migration process.

For example, the electronic device may implement a process of redirecting the content provider of the first-type file by using the Activity manager service in the system. The Activity manager service completes the foregoing redirection process when determining that both the private space running the first application and the first application meet a migration permission enabling condition. The first content provider is, for example, a content provider created by a content provider in the main space in the following embodiment. After obtaining the content provider created by the content provider in the main space, the Activity manager service instantiates the content provider, and then returns a handle of an instantiated content provider instance to the first application, so that the first application invokes the content provider instance to access and obtain a corresponding resource of the first-type file.

In a possible implementation of the first aspect, the first migration request includes a first file path and a second file path, the first file path is a path for obtaining the first specified file. and the second file path is a path for writing the first specified file. In addition, the first file path points to the main space, and the second file path points to the private space.

In a possible implementation of the first aspect, the redirecting a content provider corresponding to the first-type file from a second content provider in the private space to a first content provider in the main space includes: returning an identity document of a main space user in response to the first access request; and obtaining the first content provider based on the identity document of the main space user, where the first content provider is configured to provide the first file path.

In a possible implementation of the first aspect, the migrating the first specified file from the main space to the private space includes: obtaining the first specified file from the main space based on the first file path; and writing the obtained first specified file into the private space based on the second file path.

In other words, the first migration request responded by the electronic device is migrating the first specified file from the main space to the private space. Correspondingly, the electronic device needs to obtain the first specified file from the main space (that is, the first file path is required), and then writes the obtained first specified file into the private space (that is, the second file path is required). It may be understood that before the user selects the first specified file, the electronic device first responds to the first access request of the first application to redirect to the first content provider in the main space, and then obtains a permission to access the first-type file in the main space, that is, obtains a path for obtaining the first specified file, namely, the first file path.

As described above, the electronic device may redirect the content provider by using. for example, the Activity manager service in the system. A specific process is as follows: The electronic device first returns a main space user ID to a management module in the Activity manager service based on the first access request of the first application, and then the Activity manager service searches, based on the main space user ID, an instance cache pool for whether there is a content provider instance under a main space user name. If there is no content provider instance under the main space user name, the electronic device requests the content provider of the main space user to create a corresponding content provider, and then instantiates the content provider to obtain the first content provider in the main space. For details, refer to descriptions of related steps in FIG. 7 or FIG. 8A and FIG. 8B in the following embodiments. Details are not described herein.

In a possible implementation of the first aspect, when the first application is a file migration service, it is determined that the first application has the read and write permission on the first-type file in the main space.

To be specific, an application specified to enable the migration permission may be, for example, the file migration service described in the following embodiment. When determining that an application requesting to migrate a file is the file migration service running in the private space, the Activity manager service of the electronic device performs the foregoing redirection processing. and returns the first content provider in the main space to the file migration service, to enable a read and write permission of the file migration service in the private space on a file in the main space, thereby completing a migration process.

In a possible implementation of the first aspect, the method further includes: when determining that the first application has no migration permission on the first-type file, returning an identity document of a private space user in response to the first migration request; and obtaining the second content provider based on the identity document of the private space user, where the second content provider cannot provide a path for accessing the first specified file.

To be specific, if the file migration service running in the private space does not respond to the file migration operation of the user, for example, another application that runs in the private space and that does not meet the migration permission enabling condition responds to the file migration operation of the user, the Activity manager service of the electronic device does not perform redirection processing on the content provider of the first-type file, and returns the content provider in the private space by default. In this case, the first application running in the private space has no permission to access a file in the main space and intelligently access a file in the current space (that is, the private space). In this case, for example, the electronic device displays. a file list of the first-type file in the private space, but cannot display a file list of the first-type file in the main space.

In a possible implementation of the first aspect, the method further includes: receiving a second migration request of the first application for a second specified file in the private space, where the second migration request is used to request to migrate the second specified file from the private space to the main space, and the space running the first application is the private space: and when determining that the first application has a read and write permission on the second specified file, redirecting, in response to the second migration request, a content provider corresponding to the second specified file from a fourth content provider in the private space to a third content provider in the main space, where the third content provider is used by the first application to write the second specified file into the main space, to migrate the second specified file from the private space to the main space.

To be specific, if the file migration operation of the user is to migrate the second specified file in the current space (that is, the private space) to another space (that is, the main space), the Activity manager service of the electronic device may perform, when receiving a request of migrating the second specified file, redirection processing on the content provider corresponding to the second specified file to redirect, to the first content provider in the main space, from the second content provider that is in the private space and that is originally returned by default, and write the second specified file in the private space into the main space based on the redirected first content provider, to complete a migration process. For example, as shown in FIG. 9C in the following embodiment, when the user selects, from a file list in the private space displayed on the electronic device, a picture file that needs to be migrated, the Activity manager service of the electronic device performs redirection processing to obtain the first content provider in the main space to receive the picture file selected by the user for migration.

In a possible implementation of the first aspect, the second migration request includes a third file path and a fourth file path, the third file path is a path for accessing the second specified file, and the fourth file path is a path for writing the second specified file. In addition, the third file path points to the private space, and the fourth file path points to the main space.

In a possible implementation of the first aspect, the redirecting a content provider corresponding to the second specified file from a fourth content provider in the private space to a third content provider in the main space includes: returning an identity document of a main space user in response to the second migration request; and obtaining the third content provider based on the identity document of the main space user, where the third content provider is configured to provide the fourth file path.

In a possible implementation of the first aspect, the migrating the second specified file from the private space to the main space includes: obtaining the second specified file from the private space based on the third file path; and writing the obtained second specified file into the main space based on the fourth file path.

In other words, the second migration request responded by the electronic device is migrating the second specified file from the private space to the main space. Correspondingly, the electronic device needs to obtain the second specified file from the private space (that is, the third file path is required), and then writes the obtained second specified file into the main space (that is, the fourth file path is required). In this case, the Activity manager service of the electronic device may perform, after the user selects the second specified file, redirection processing to obtain the third content provider in the main space to obtain the corresponding fourth file path used to write, into the main space, the second specified file that needs to be migrated.

In a possible implementation of the first aspect, when the first application is a file migration service, it is determined that the first application has a migration permission on the second specified file.

In a possible implementation of the first aspect, the first-type file includes any one of a picture, a video, audio, and a contact.

In a possible implementation of the first aspect, a type of the second specified file includes any one of a picture, a video, audio, and a contact.

It may be understood that after migrating the first specified file from the main space to the private space, the electronic device may further display the first specified file in response to an operation of viewing, by the user, the first specified file in an interface of a second application (for example, any one of Gallery, Recorder, or Contacts) running in the private space. For details, refer to FIG. 5E and FIG. 5F and related descriptions in the following embodiments. Details are not described herein.

It may be understood that after the second specified file is migrated from the private space to the main space, the method further includes: The electronic device may further display the second specified file in response to an operation of viewing. by the user, the second specified file in an interface of a second application (for example, any one of Gallery, Recorder, or Contacts) running in the main space. For details, refer to FIG. 9E and FIG. 9F and related descriptions in the following embodiments. Details are not described herein.

According to a second aspect, an embodiment of this application provides a file migration method applied to an electronic device. A main space, a private space, and a first application are disposed on the electronic device, and a filesystem of the electronic device is a filesystem in user space. The method includes: receiving a first access request of the first application for a first-type file in the private space, where a space running the first application is the main space; when determining that the first application has a read permission on the first-type file in the private space, redirecting. in response to the first access request, a content provider corresponding to the first-type file from a first content provider in the main space to a second content provider in the private space, where the second content provider is used by the first application to obtain the first-type file; receiving a second migration request of the first application for a first specified file in the first-type file in the private space, where the second migration request is used to request to migrate the first specified file from the private space to the main space; and in response to the second migration request, migrating the first specified file from the private space to the main space when determining that the first application has a read and write permission on the first-type file in the private space.

In other words, after the first application running in the main space has the read and write permission on the first-type file in the private space, the first-type file may be read from the private space, and then written into the main space, and the first-type file may also be deleted from the private space. The read and write permission is, for example, a migration permission described in the following embodiment. To be specific, when the main space is a space specified to enable the migration permission and the first application that performs a file migration operation is also an application authorized to enable the migration permission, if the first application running in the main space requests to access the first-type file in the main space, the system of the electronic device may redirect the content provider corresponding to the first-type file from the originally default first content provider in the main space to the second content provider in the private space. so as to obtain a permission to access the first-type file in the private space. In this case, the electronic device may display a file list of the first-type file in the private space for a user to perform selection. After the user selects the first specified file that needs to be migrated, the system of the electronic device may obtain the first specified file based on the redirected first content provider in the private space, and migrate the first specified file to the main space.

In a possible implementation of the second aspect, the method further includes: receiving a second migration request of the first application for a second specified file in the main space, where the second migration request is used to request to migrate the second specified file from the main space to the private space, and the space running the first application is the main space; and when determining that the first application has a read and write permission on the second specified file, redirecting. in response to the second migration request, a content provider corresponding to the second specified file from a third content provider in the main space to a fourth content provider in the main space, where the fourth content provider is used by the first application to write the second specified file into the private space, to migrate the second specified file from the main space to the private space.

To be specific, if the file migration operation of the user is to migrate the second specified file in the current space (that is, the main space) to another space (that is, the private space), an Activity manager service of the electronic device may perform, when receiving a request of migrating the second specified file, redirection processing on the content provider corresponding to the second specified file to redirect the content provider to the second content provider in the private space from the first content provider that is in the main space and that is originally returned by default, and write the second specified file in the main space into the private space based on the redirected second content provider, to complete a migration process.

According to a third aspect, an embodiment of this application provides an electronic device, including one or more processors and one or more memories. The one or more memories store one or more programs, and when the one or more programs are executed by the one or more processors, the electronic device is enabled to perform the foregoing file migration method.

According to a fourth aspect, an embodiment of this application provides a computer-readable storage medium. The storage medium stores instructions, and when the instructions are executed on a computer, the computer is enabled to perform the foregoing file migration method.

According to a fifth aspect, an embodiment of this application provides a computer program product, including a computer program/instructions. When the computer program/instructions are executed by a processor, the foregoing file migration method is implemented.

DESCRIPTION OF EMBODIMENTS

Figure 1A:
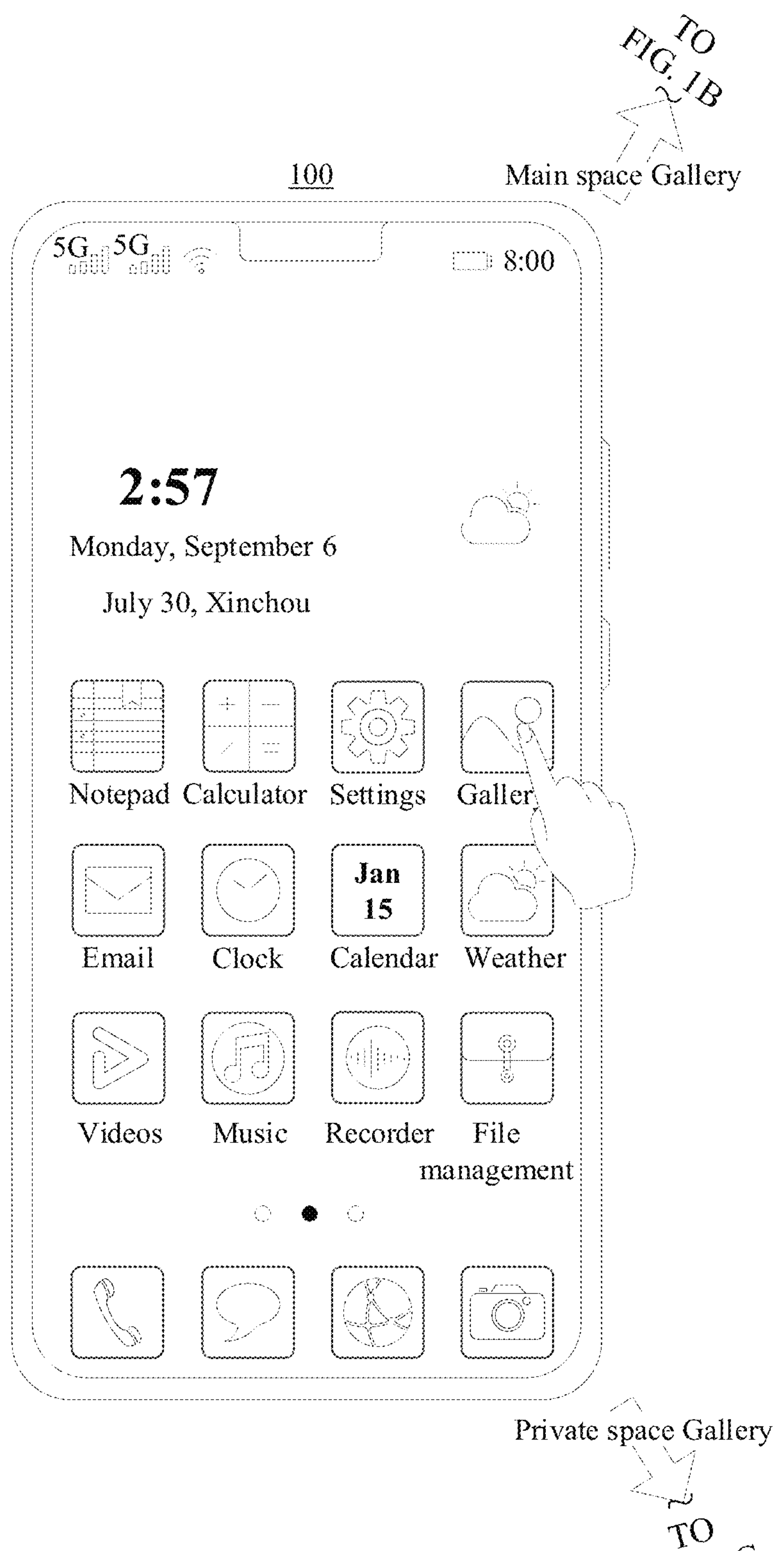
FIG. 1A to FIG. 1C are schematic diagrams of an application scenario of a file migration method according to an embodiment of this application.
Figure 1B:
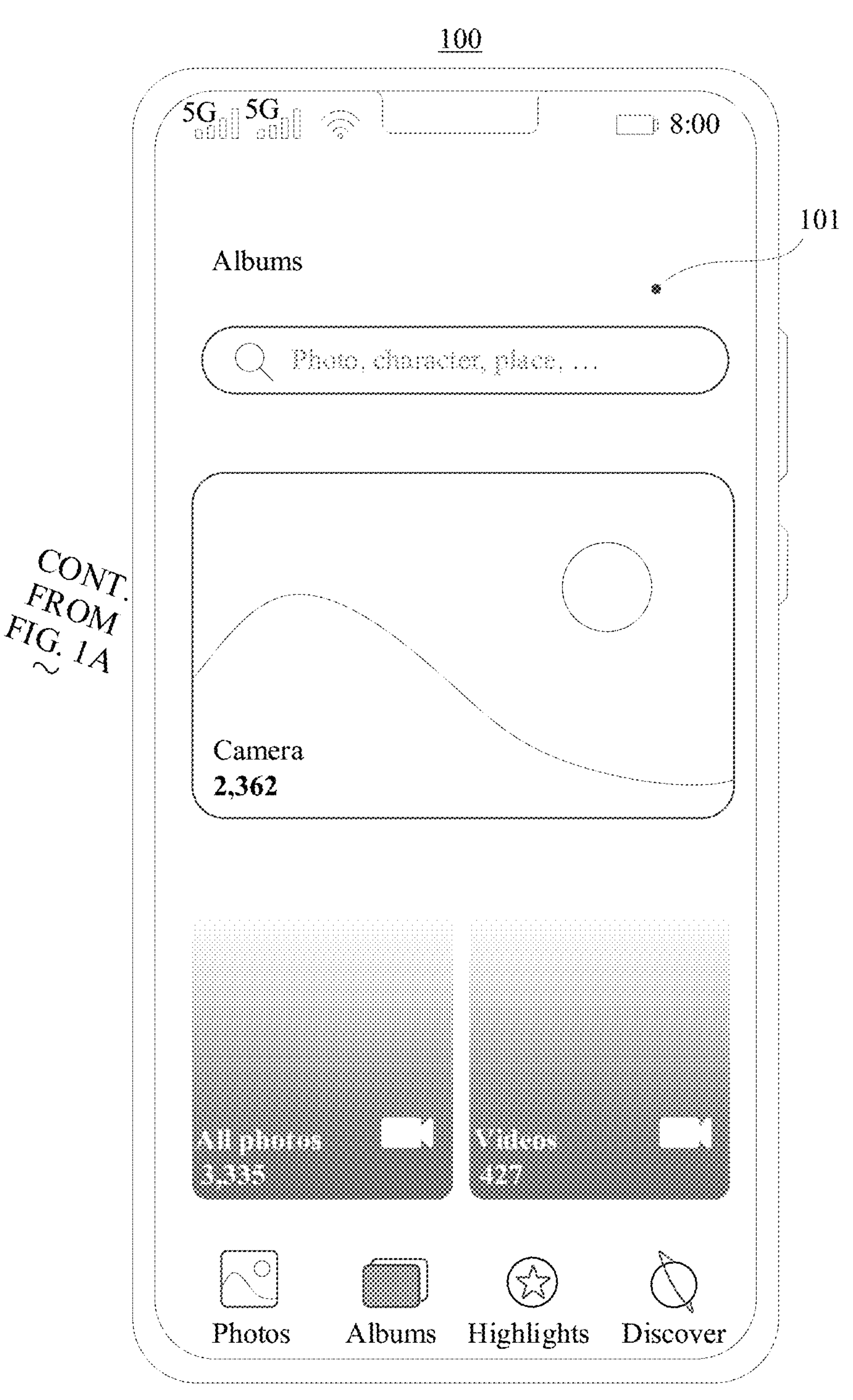
Figure 1C:
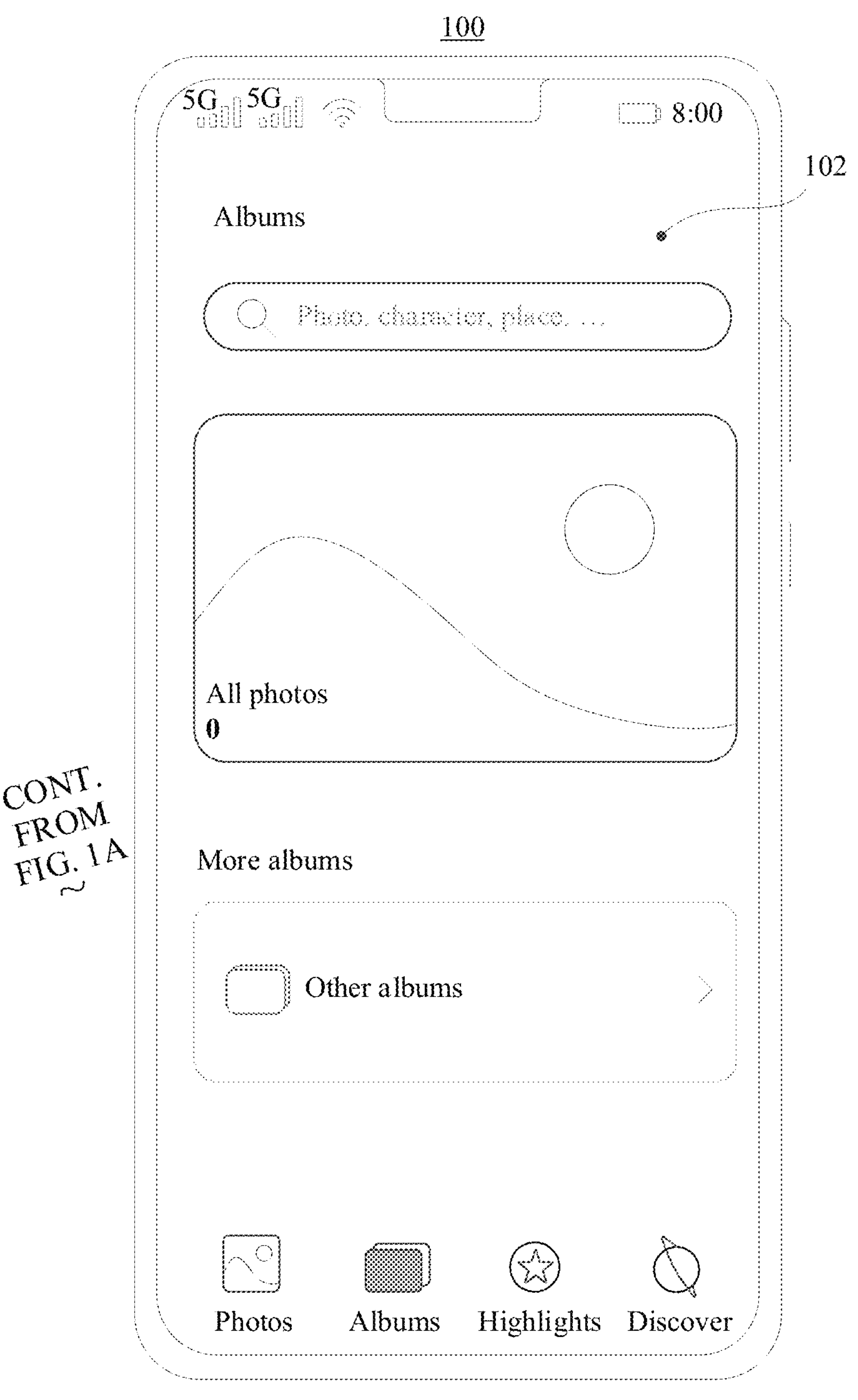

FIG. 1A to FIG. 1C are schematic diagrams of an application scenario of a file migration method according to an embodiment of this application.

As shown in FIG. 1A to FIG. 1C, the scenario includes a mobile phone 100, and a FUSE filesystem is applied to a system of the mobile phone 100. It may be understood that, the mobile phone 100 creates, by default at delivery, a main space used to respond to a user operation, and the main space is referred to as a main space below. In a process in which a user uses the mobile phone 100, the mobile phone 100 runs the main space by default, and the user may tap an application icon on a home screen of the main space to run various installed applications. The user may operate the mobile phone 100 to create another user operating space that is used to protect private data and that is isolated from the main space, and the user operating space is referred to as a private space below. It may be understood that the main space and the private space may have a same system application by default. However, when the user creates the private space, a third-party application installed in the main space is not installed in the private space by default. If the user needs to install a third-party application in the private space, the user may install the third-party application independently in the private space. It may be understood that a running space provided in the main space for each application and a filesystem space under a main space user name are isolated from a running space provided in the private space for each application and a filesystem space under a private space user name. To simplify description, the filesystem space under the main space user name is referred to as a u0 user space, and the filesystem space under the private space user name is referred to as a u10 user space. Based on the foregoing understanding, unless otherwise specified, in this application, a main space user and a u0 user, and a private space user and a u10 user are generally not distinguished.

For example, for home screens of both the main space and the private space, refer to FIG. 1A.

If FIG. 1A shows the home screen of the main space of the mobile phone 100, the user may tap a gallery application on the home screen of the main space shown in FIG. IA, to open a gallery application interface 101 shown in FIG. 1B. As shown in FIG. 1B, the gallery application interface 101 displays the following: the main space stores 3335 photos in "All photos" and stores 427 videos, where 2362 photos are shot by a camera.

If FIG. 1A is the home screen of the private space of the mobile phone 100, the user may tap a gallery application on the home screen of the private space shown in FIG. 1A, to open a gallery application interface 102 shown in FIG. 1C. As shown in FIG. 1C, the gallery application interface 102 displays the following: the private space stores no photo in "All photos" and stores no video file.

Based on the difference between file data displayed in the gallery application interface 101 shown in FIG. 1B and file data displayed in the gallery application interface 102 shown in FIG. 1C, it may be understood that different filesystem spaces (for example, the u0 user space and the u10 user space described above) in the FUSE filesystem applied to the mobile phone 100 are isolated from each other, that is, file data in the filesystem spaces in the FUSE filesystem is displayed independently in corresponding operating spaces.

To resolve a problem that file data in one filesystem space cannot be migrated to another filesystem space on an electronic device to which a FUSE filesystem is applied, this application proposes a file migration method. In the method, when a user performs a file migration operation in a private space, if the file migration operation needs to access a file or a file storage path in a main space, a content provider of a u0 user can be redirected to, so as to obtain an access and write permission (that is, a read and write permission) on a file in the main space by using the content provider of the u0 user. When the file migration operation only needs to access a file in the private space, the file migration operation may be completed by using an operation of reading and writing a local file flow in the private space. Redirecting to the content provider of the u0 user means the following: An Activity manager service (Activity Manager Service, AMS) that is in an operating system of an electronic device and that can be jointly invoked by the main space and the private space transfers a file access request of a private space user (that is, a u10 user) to a content provider in the main space, so as to authorize a specified application (such as a file migration service) in a specified space (such as the private space) to access a file in the main space. The Activity manager service needs to first determine and verify whether an initiator of the file access request meets a migration permission enabling condition, and completes, when determining that the initiator of the file access request meets the migration permission enabling condition, a redirection process of transferring the file access request to the content provider in the main space. It may be understood that in some other embodiments, according to the file migration method provided in this application, when the user performs a file migration operation in the main space. if the file migration operation performed by the user in the main space needs to access a file or a file storage path in the private space, a content provider of the u10 user can be redirected to, so as to obtain an access and write permission on a file in the private space by using the content provider of the u10 user. Details are not described herein.

The migration permission enabling condition includes, for example, determining whether a current space operated by the user on the electronic device is a specified space (for example, the private space), and determining whether an application that executes a corresponding instruction of the migration operation is a specified application (for example, a file migration service). When it is determined that the current space is the private space and the application that responds to the migration operation of the user is the file migration service, it is determined that both the current space and the application that responds to the migration operation of the user meet the preset migration permission enabling condition. In this case, the file migration service in the private space is allowed to access an original filesystem space such as the u0 user space to obtain a user-specified file such as a picture file, and the file migration service is allowed to move the obtained picture file to a target filesystem space, for example, move the obtained picture file to the u10 user space. In this way, when operating the electronic device to enter the private space again, the user can view; in a gallery application running in the private space, the picture file moved from the main space.

Figure 2A:
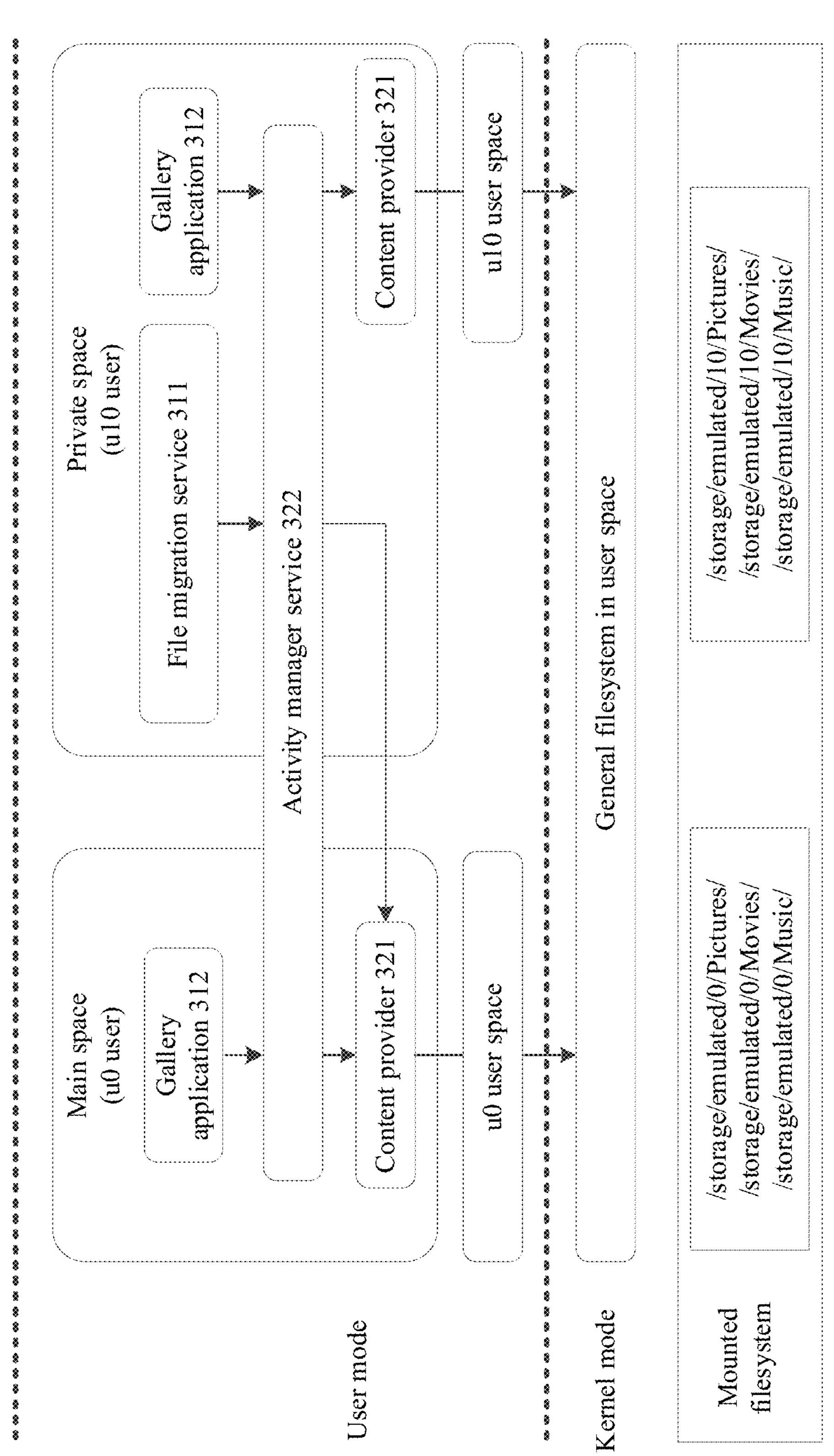
FIG. 2A and FIG. 2B are schematic diagrams of interaction between a user mode and a kernel mode of a filesystem in user space applied to a mobile phone 100 in a process of implementing a file migration method according to an embodiment of this application.
Figure 2B:
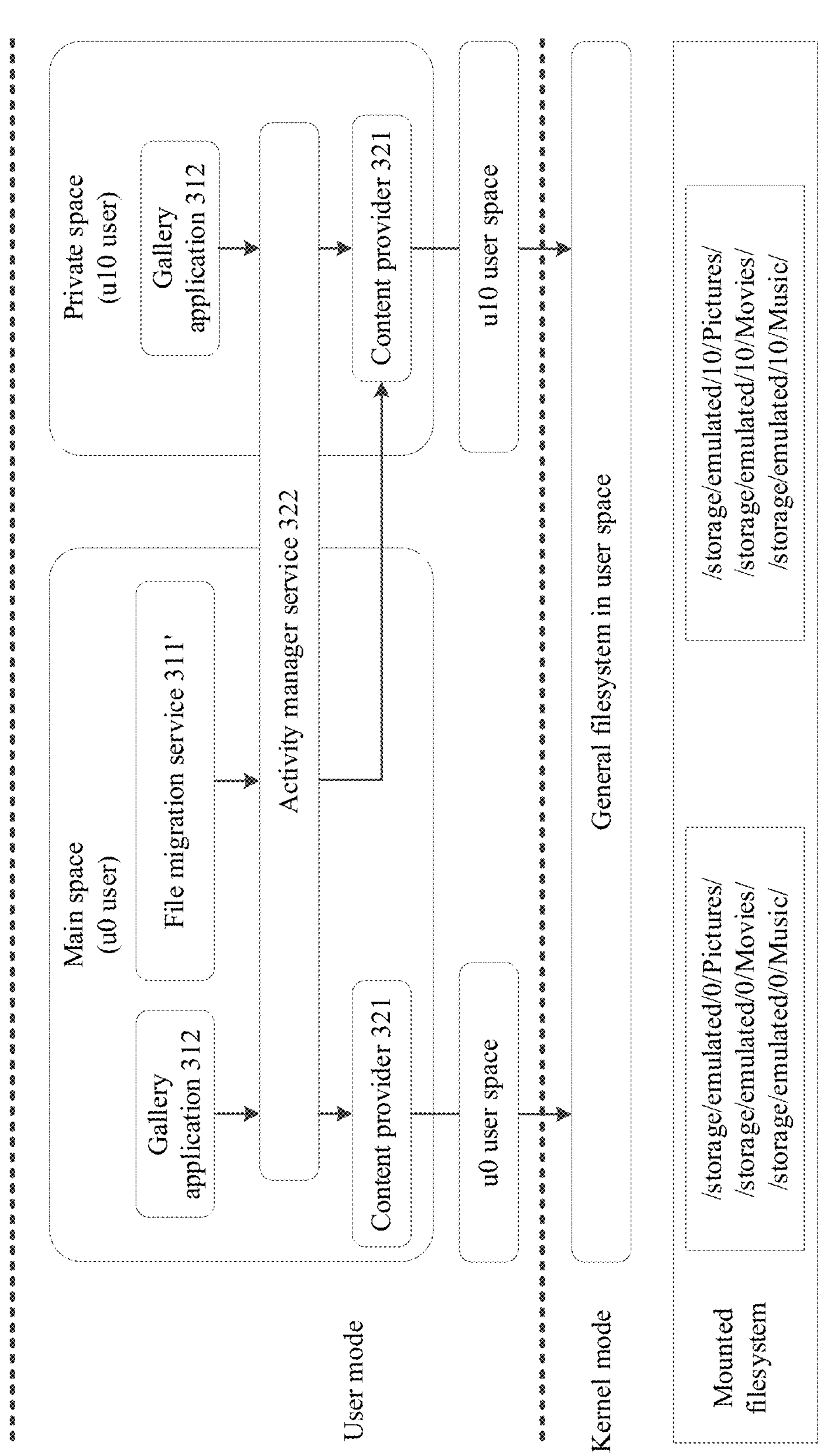

FIG. 2A and FIG. 2B are schematic diagrams of interaction between a user mode and a kernel mode of a filesystem in user space applied to a mobile phone 100 in a process of implementing a file migration method in this application according to an embodiment of this application.

As shown in FIG. 2A, the FUSE filesystem applied to the mobile phone 100 includes a user mode and a kernel mode, the user mode includes a main space (corresponding to a u0 user) and a private space (corresponding to a u10 user), and the user mode further includes an Activity manager service 322 that can be jointly invoked by the main space and the private space. The main space and the private space each include a gallery application 312 and a content provider 321, and a file migration service 311 is further installed in the private space. As shown in FIG. 2A, a user-mode filesystem includes a u0 user space of a main space user and a u10 user space under a private space user name, that is, user-mode filesystems under different user names are isolated from each other.

The kernel mode includes a general user space filesystem that manages file data stored in an external storage area (including an external storage of a built-in memory or an externally embedded storage such as an SD card or a USB storage) of the mobile phone 100.

As shown in FIG. 2A, under management of the FUSE filesystem, in the mobile phone 100, a directory attribute of a filesystem mounted in the u0 user space is u0_xxx, for example, a picture file directory is /storage/emulated/0/Pictures/, a video file directory is /storage/emulated/0/Movies/, and an audio file directory is /storage/emulated/0/Music/; and a directory attribute of a filesystem mounted in the u10 user space is u10_xxx, for example, a picture file directory is /storage/emulated/10/Pictures/, a video is file directory /storage/emulated/10/Movies/, and an audio file directory is /storage/emulated/10/Music/. This is not limited herein.

It may be understood that, an application such as the gallery application 312 in the user-mode main space may obtain, by using the Activity manager service 322, a content provider created by the content provider 321 in the main space, so as to access a file in the main space to perform corresponding processing; and an application such as the gallery application 312 in the user-mode private space may obtain, by using the Activity manager service 322, a content provider created by the content provider 321 in the private space, so as to access a file in the private space to perform corresponding processing.

In a process of performing file migration by the mobile phone 100, that a user performs an operation in the private space to migrate a user-specified file from the main space to the private space is used as an example. When meeting a migration permission specified to be enabled, the file migration service 311 running in the user-mode private space may obtain, by using the Activity manager service 322, the content provider created by the content provider 321 in the main space, so as to access a file in the main space, for example, duplicate or delete the file in the main space; and write, into the private space by using the content provider created by the content provider 321 in the private space, the file duplicated from that in the main space, so as to migrate the file in the main space to the private space.

In some other embodiments, refer to FIG. 2B. A file migration service 311' may also be disposed in the user-mode main space. That a user performs an operation in the main space to migrate a user-specified file from the main space to the private space is used as an example. When meeting a migration permission specified to be enabled, the file migration service 311' running in the user-mode main space may obtain, by using the Activity manager service 322, the content provider created by the content provider 321 in the private space, so as to access the private space to write a file in the main space into the private space, to migrate the file in the main space to the private space.

It may be understood that the file migration operation of the user is an operation of migrating a specified file from an original filesystem space to a target filesystem space for management. Therefore, after the user completes the file migration operation in the private space, when the user re-operates the electronic device to enter the target filesystem space, the migrated specified file may be displayed under a corresponding file directory in the target filesystem space, and the migrated specified file may be deleted from a corresponding file directory in the original filesystem space. This is not limited herein. The target filesystem space may be the u0 user space or may be the u10 user space. This is not limited herein.

It may be understood that, according to the file migration method provided in this application, on an electronic device to which a FUSE filesystem is applied, a file migration permission is enabled for a specified application running in a specified space, so that on the premise that file data in spaces in the FUSE filesystem is isolated, a user can migrate some data that requires privacy protection in a main space to a private space, or migrate data that no longer requires privacy protection in the private space to the main space. Another unspecified filesystem space or an unspecified application cannot obtain a permission to migrate a file in another space. for example, a cloner application in the private space (assuming that the application is not an application specified to be unauthorized) cannot obtain a file migration permission on a picture file in the main space, to be specific, the cloner application running in the private space cannot access or obtain the picture file in the main space, or cannot duplicate file data in the private space to the main space. Therefore, it may be understood that the solution provided in this application can not only ensure security of file data in each space, but also meet a specific requirement of a user for implementing privacy protection through file migration, or the like.

It may be understood that, file data for which the file migration method provided in this application targets may include a picture, audio, a video, a document, a contact, and the like. This is not limited herein.

It may be understood that, an electronic device to which the file migration method provided in this application is applicable may include but is not limited to a mobile phone 100, a laptop computer, a desktop computer, a tablet computer, a server, a wearable device, a head mounted display, a mobile email device, a vehicle-mounted device, a portable game console, a portable music player, a reader device, a television with one or more processors embedded or coupled, or another electronic device that can access a network. For ease of description, an example in which the electronic device is the mobile phone 100 is used below to describe a specific process in which the electronic device implements the solution in this application and related interfaces.

Based on the example process of interaction between the user mode and the kernel mode of the FUSE filesystem shown in FIG. 2A, that the file migration service 311 is disposed in the user-mode private space is used as an example below to describe, with reference to other accompanying drawings, in detail a specific process in which a user operates a file for migration in the private space to implement the file migration method in this application.

Figure 3:
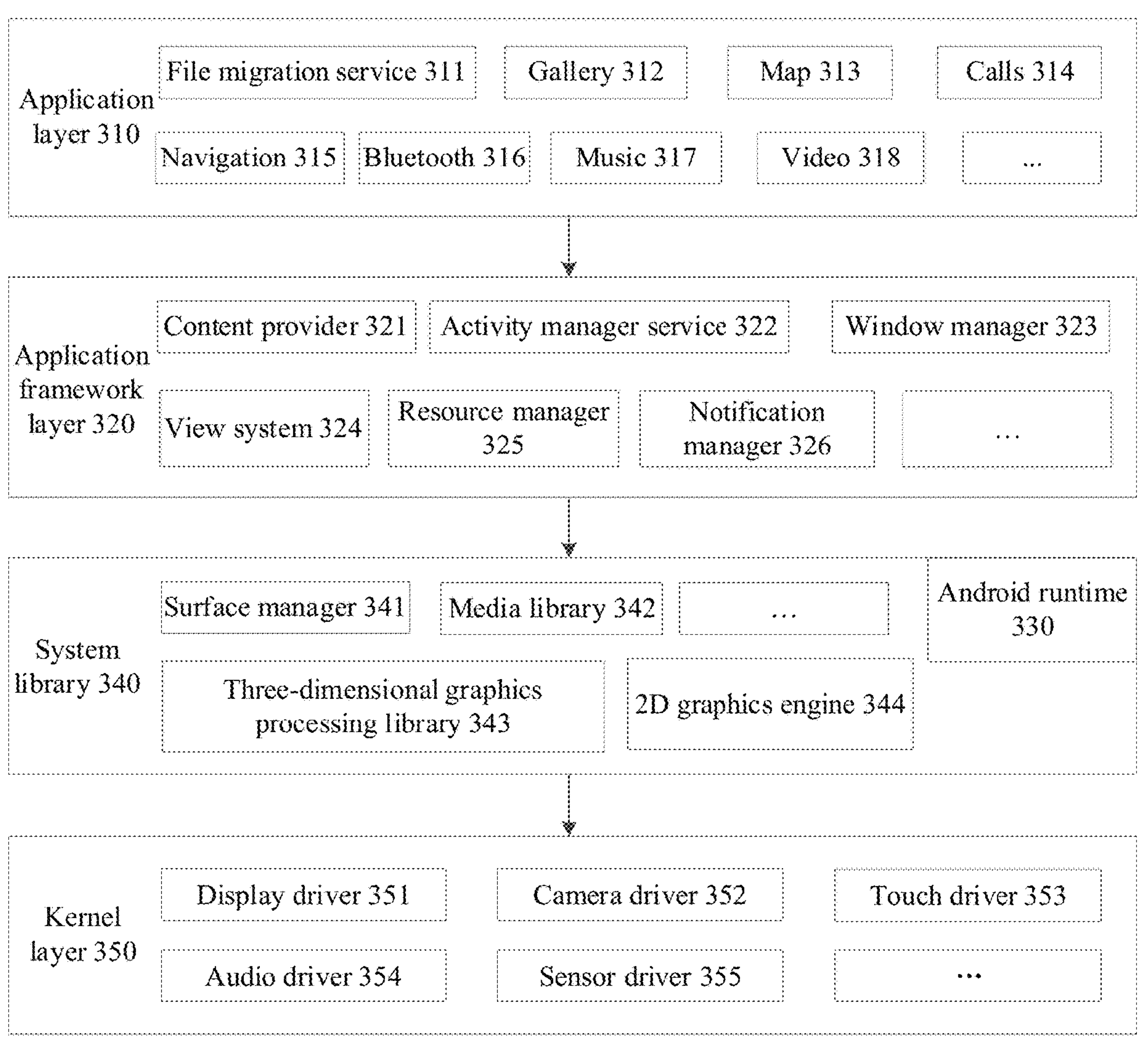
FIG. 3 is a schematic diagram of a software architecture of a system of a mobile phone 100 according to an embodiment of this application.

FIG. 3 is a schematic diagram of a software architecture of a system of a mobile phone 100 according to an embodiment of this application.

A software system of the mobile phone 100 may use a layered architecture, an event-driven architecture, a microkernel architecture, a micro service architecture, or a cloud architecture. In this embodiment of this application, an Android system with a layered architecture is used as an example to describe a software architecture of the mobile phone 100.

The layered architecture divides software into several layers, and each layer has a clear role and task. The layers communicate with each other through software interfaces. In some embodiments, the Android system is divided into four layers from top to bottom: an application layer 310, an application framework layer 320, an Android runtime (Android runtime) 330 and system library 340, and a kernel layer 350.

The application layer 310 may include a series of application packages.

As shown in FIG. 3, the application package may include applications such as a file migration service 311, Gallery 312, Map 313, Calls 314, Navigation 315, Bluetooth 316, Music 317, and Video 318.

The application framework layer 320 provides an application programming interface (application programming interface, API) and a programming framework for the application at the application layer 310. The application framework layer 320 includes some predefined functions.

As shown in FIG. 3, the application framework layer 320 may include a content provider (also referred to as a content provider, Content Provider) 321, an Activity manager service 322, a window manager 323, a view system 324, a resource manager 325, a notification manager 326, and the like.

The content provider 321 is configured to: store and obtain file data and make the data accessible to an application. The file data may include videos, images, audio, calls that are made and answered, browsing histories and bookmarks, address books, and the like. For ease of differentiation, a content provider that is created by the content provider 321 and that is used for invoking by a specific application is referred to as a content provider in the following description, and similarly, an instantiated content provider is referred to as a content provider instance or an instance.

It may be understood that, on the mobile phone 100 to which a FUSE filesystem is applied, content providers that are created by content providers 321 of space users (for example, a main space user or a private space user) and that are respectively used to access files in filesystem spaces are also isolated from each other. The content provider created by the content provider 321 may be instantiated in the Activity manager service 322 to form a content provider instance. It may be understood that an instantiated content provider is an invokable file, and an application can invoke the content provider instance to access a file in a filesystem space. Generally, each content provider instance used for invoking by the application have an invoking identifier, that is, a handle. Therefore, the content provider 321 feeds back the handle of the content provider instance to the application by using the Activity manager service 322, so that the application invokes the content provider instance.

For example, in this embodiment of this application, when determining whether a current space is a private space and an application that is currently running and that requests to migrate a file is a file migration service, the system of the mobile phone 100 may feed back, to the file migration service in the private space, an instance handle that corresponds to a content provider created by the content provider 321 in a main space and that is used to access a file in the main space, so as to complete a process of migrating a specified file in the main space to the private space or migrating a specified space in the private space to the main space.

The Activity manager service 322 is configured to provide a query service, and store, manage, and record statuses (that is, lifecycles) of four Android components by using an activity stack (activity stack). When the system is started, the Activity manager service 322 is enabled by starting a thread by a system server (System Server). An application in each filesystem space may obtain, by using the Activity manager service 322, an instance handle corresponding to a content provider provided by the content provider 321 in the current space, so as to access and obtain file data in the current space. In this embodiment of this application, a specified application in a specified space, for example, the file migration service in the private space, may obtain, by using the Activity manager service 322, an instance handle corresponding to a content provider provided by the content provider 321 in the main space, so as to obtain a permission to access, duplicate, and delete file data in the main space, thereby completing a process of migrating a specified file in the main space to the private space or migrating a specified space in the private space to the main space.

The window manager 323 is configured to manage a window program. The window manager 323 may obtain a size of a display, determine whether a status bar exists, lock a screen, take a screenshot, and the like.

The view system 324 includes visual controls, for example, a control for displaying text and a control for displaying a picture. The view system 324 may be configured to construct an application. A display interface may include one or more views. For example, a display interface including an SMS message notification icon may include a view for displaying text and a view for displaying a picture.

The resource manager 325 provides various resources for an application, for example, a localized string, an icon, a picture, a layout file, and a video file.

The notification manager 326 enables an application to display notification information in a status bar, and may be configured to convey a notification-type message, where the displayed notification information may automatically disappear after a short stay without user interaction. For example, the notification manager 326 is configured to notify download completion, provide a message reminder, and the like. The notification manager 326 may alternatively be a notification that appears in a top status bar of a system in a form of a graph or scroll bar text, for example, a notification of an application running in the background, or a notification that appears on a screen in a form of a dialog window. For example, text information is prompted in the status bar, an alert tone is produced, the electronic device vibrates, or an indicator light blinks.

The Android Runtime (Android runtime) 330 includes a kernel library and a virtual machine. The Android Runtime (Android runtime) 330 is responsible for scheduling and management of the Android system.

The kernel library includes two parts: One part is a functional function that needs to be invoked by a java language, and the other part is a kernel library of Android.

The application layer 310 and the application framework layer 320 run in the virtual machine. The virtual machine executes java files at the application layer 310 and the application framework layer 320 as binary files. The virtual machine is configured to perform functions such as lifecycle management of an object, stack management, thread management, security and exception management, and garbage collection.

The system library 340 may include a plurality of functional modules, for example, a surface manager (surface manager) 341, a media library (Media Libraries) 342, a three-dimensional graphics processing library 343 (for example, OpenGL ES), and a 2D graphics engine 344 (for example, SGL).

The surface manager 341 is configured to manage a display subsystem, and provide fusion of 2D and 3D layers for a plurality of applications.

The media library 342 supports play back and recording in a plurality of common audio and video formats, static image files, and the like. The media library may support a plurality of audio and video coding formats such as MPEG4, H.264, MP3, AAC, AMR, JPG, and PNG.

The three-dimensional graphics processing library 343 is used to implement three-dimensional graphics drawing, image rendering, composition, layer processing, and the like.

The 2D graphics engine 344 is a drawing engine for 2D drawing.

The kernel layer 350 is a layer between hardware and software. The kernel layer 350 includes at least a display driver 351, a camera driver 352, a touch driver 353, an audio driver 354, and a sensor driver 355.

Based on the system software architecture of the mobile phone 100 shown in FIG. 3, a specific process in which the mobile phone 100 implements the file migration method in this application is described below in detail with reference to a plurality of flowcharts.

Figure 4:
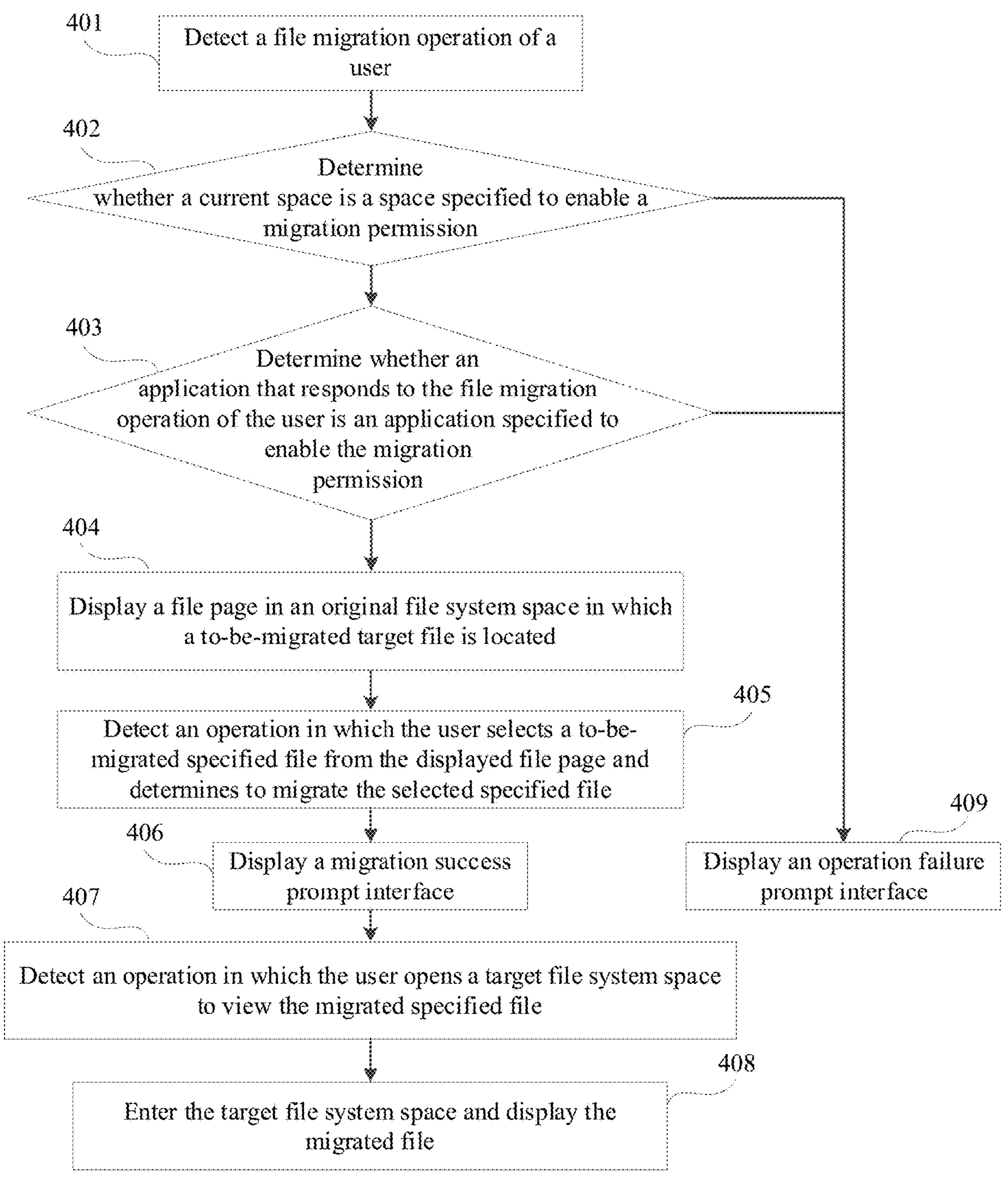
FIG. 4 is a schematic flowchart of an implementation of a file migration method in this application according to an embodiment of this application.

FIG. 4 is a schematic flowchart of an implementation of a file migration method in this application according to an embodiment of this application. It may be understood that steps in the procedure all are performed by the mobile phone 100. For ease of description, execution bodies of the steps are no longer repeatedly described when specific implementation processes of the steps in the procedure are described below:

As shown in FIG. 4, the procedure includes the following steps.

401: Detect a file migration operation of a user.

For example, the user may enable the file migration service in a display interface of the mobile phone 100. For example, the user operates the mobile phone 100 to enter a private space management interface, and then selects a file migration service for migration from a main space to a private space, or selects "a file migration service for migration from the private space to the main space".

For example, FIG. 5A to FIG. 5F are schematic diagrams of some interfaces displayed in a process in which the mobile phone 100 implements the solution in this application to migrate a file in a main space to a private space according to an embodiment of this application.

Figure 5A:
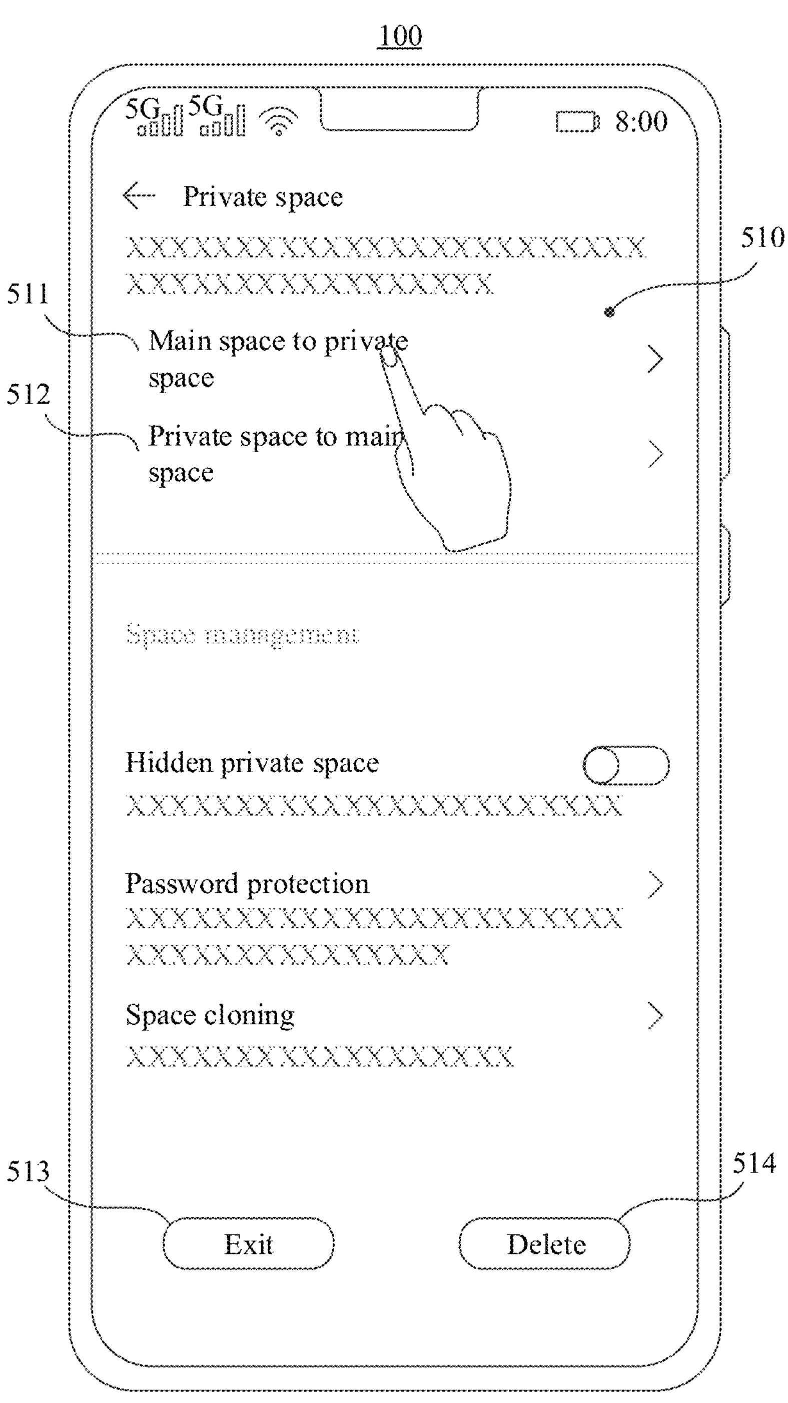
FIG. 5A to FIG. 5F are schematic diagrams of some interfaces displayed in a process in which a mobile phone 100 implements a solution in this application to migrate a file in a main space to a private space according to an embodiment of this application.

For a process in which the user operates the mobile phone 100 to enter the private space management interface, refer to FIG. 5A. After the user operates the mobile phone 100 to enter the private space, the user may operate the mobile phone 100 to open a private space management interface 510 shown in FIG. 5A. For example, the user may tap a settings application icon on a home screen (refer to FIG. 1A) of the main space of the mobile phone 100 to select a "privacy." option, and then tap the "private space" to enter a private space login interface. After verifying password information set by the user, the mobile phone 100 enters the private space. The user may tap a settings application icon on a home screen (refer to FIG. 1A) of the private space of the mobile phone 100 to select a "privacy" option, and then tap the "private space" to enter the private space management interface 510 shown in FIG. 5A. In some other embodiments, the user may use other operations to operate the mobile phone 100 to open the private space management interface 510. This is not limited herein.

As shown in FIG. 5A, the user may tap a "main space to private space" option 511 or a "private space to main space" option 512 in the private space management interface 510, to enable the mobile phone 100 to run the file migration service. In addition, the user may tap an Exit button 513 in the private space management interface 510 to exit the private space to return to the main space, or may tap a Delete button 514 in the private space management interface 510 to delete the created private space. After the private space is deleted, file data in the private space is also deleted. For example, after the user taps the "main space to private space" option 511. the mobile phone 100 may display an operating interface 520, shown in FIG. 5B, for migration to the private space.

Figure 5B:
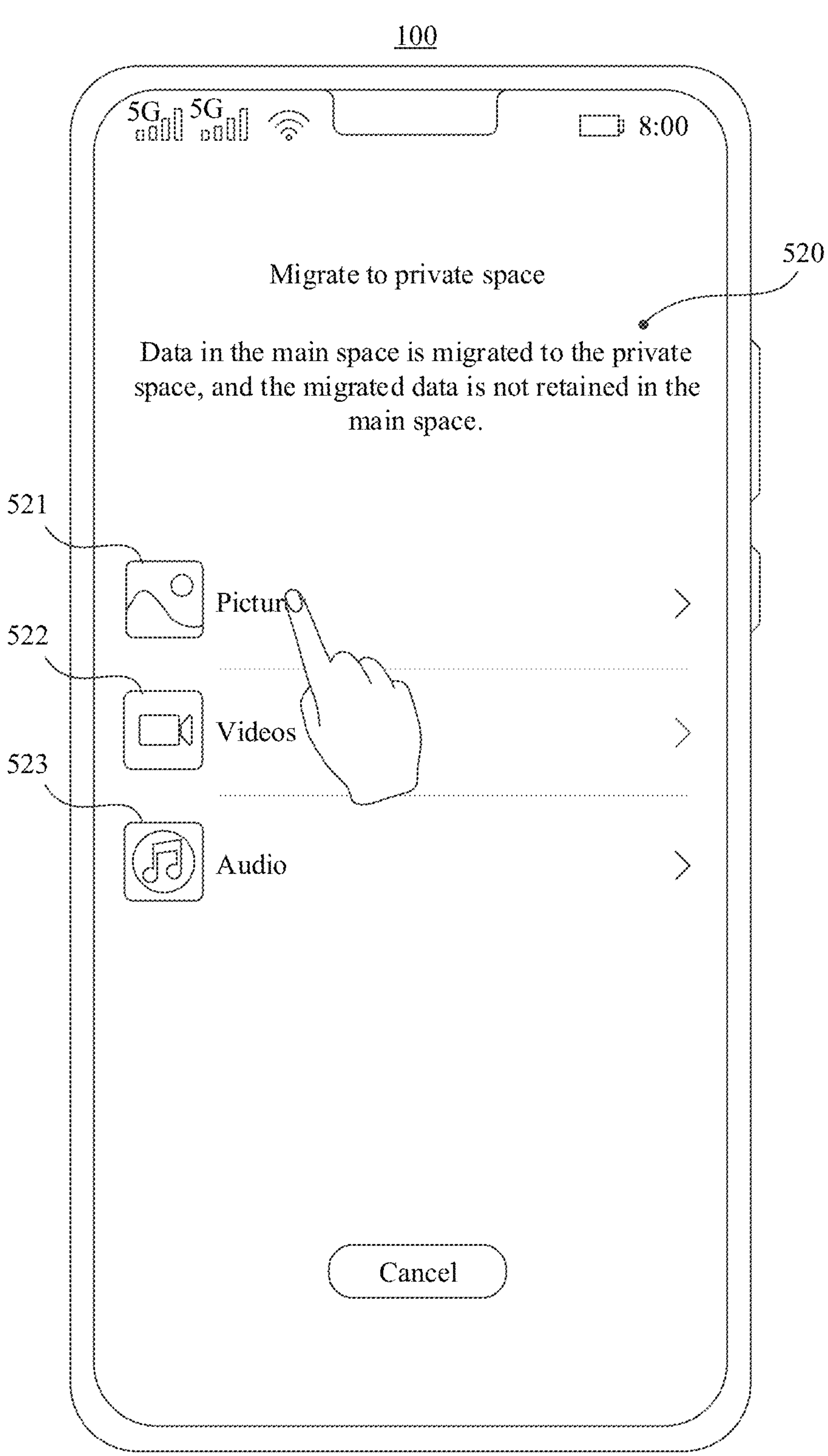

As shown in FIG. 5B, the operating interface 520 for migration to the private space includes a picture 521, a video 522, and audio 523 that can be migrated. For example, if the user selects the picture 521, the mobile phone 100 may display a picture selection interface 530 shown in FIG. 5C. FIG. 5C to FIG. 5F and related descriptions are described in the following corresponding steps, and details are not described herein.

402: Determine whether a current space is a space specified to enable a migration permission. If a determining result is "yes", it indicates that the file migration operation of the user may be a valid operation authorized and allowed by the system of the mobile phone 100, and the mobile phone 100 may continue to perform the following step 403 to further determine whether an application responding to the file migration operation of the user is an application specified to enable the migration permission. If the determining result is "no", it indicates that the file migration operation of the user is not an operation authorized and allowed by the system of the mobile phone 100, that is, the file migration operation is an invalid operation, and the mobile phone 100 may directly perform the following step 409 to notify the user that the operation fails.

For example, the space specified to enable the migration permission may be, for example, the private space. If the file migration operation of the user is an operation performed in a scenario in which the mobile phone 100 runs the private space, the file migration operation may be a valid operation. If the file migration operation of the user is not an operation performed in the scenario in which the mobile phone 100 runs the private space, for example, the file migration operation is an operation performed in a scenario in which the mobile phone 100 runs the main space or another user operating space, it may be determined that the operation is an invalid operation and is an operation that cannot be responded to by the mobile phone 100.

It may be understood that in some other embodiments, the space specified to enable the migration permission may be, for example, another user operating space. This is not limited herein.

403: Determine whether an application that responds to the file migration operation of the user is an application specified to enable the migration permission. If a determining result is "yes", it indicates that the file migration operation of the user is a valid operation authorized and allowed by the system of the mobile phone 100, and the mobile phone 100 may continue to perform the following step 404 to continue to respond to a next operation of the user. If the determining result is "no", it indicates that the file migration operation of the user is an invalid operation that is not authorized by the system of the mobile phone 100, and the mobile phone 100 may directly perform the following step 409 to notify the user that the operation fails.

For example, the application specified to enable the migration permission may be, for example, a file migration service 311 on the mobile phone 100. If the file migration operation performed by the user is performed by enabling the file migration service 311, with reference to the case in which the determining result of step 402 is "yes", it may be determined that the file migration operation of the user is a valid operation authorized and allowed by the system of the mobile phone 100, and the mobile phone 100 needs to respond to the file migration operation of the user, to continue to perform the following step to perform file migration. On the contrary, if the file migration operation performed by the user is performed by using another unspecified application, for example, the file migration operation is performed by using a cloner application installed on the mobile phone 100, and the cloner application is an application whose migration permission is unspecified by the mobile phone 100 to be authorized, it may be determined that the file migration operation is an operation not allowed by the system of the mobile phone 100, and the mobile phone 100 does not respond to the file migration operation.

It may be understood that in some other embodiments, the application specified to enable the migration permission may alternatively be another application that can ensure security of data in each filesystem space of the mobile phone 100. This is not limited herein.

404: Display a file page in an original filesystem space in which a to-be-migrated target file is located.

For example, after the determining processes in steps 402 and 403 are performed, if it is determined that the file migration operation of the user is a valid operation authorized and allowed by the system of the mobile phone 100, the mobile phone 100 may respond to the file migration operation to display a file page in a filesystem space in which a target file (that is, a specified file) that the user needs to migrate is located. The filesystem space in which the target file is located may be referred to as the original filesystem space below. For example, the original filesystem space may be a u0 user space or a u10 user space that is created by the user on the mobile phone 100.

Figure 5C:
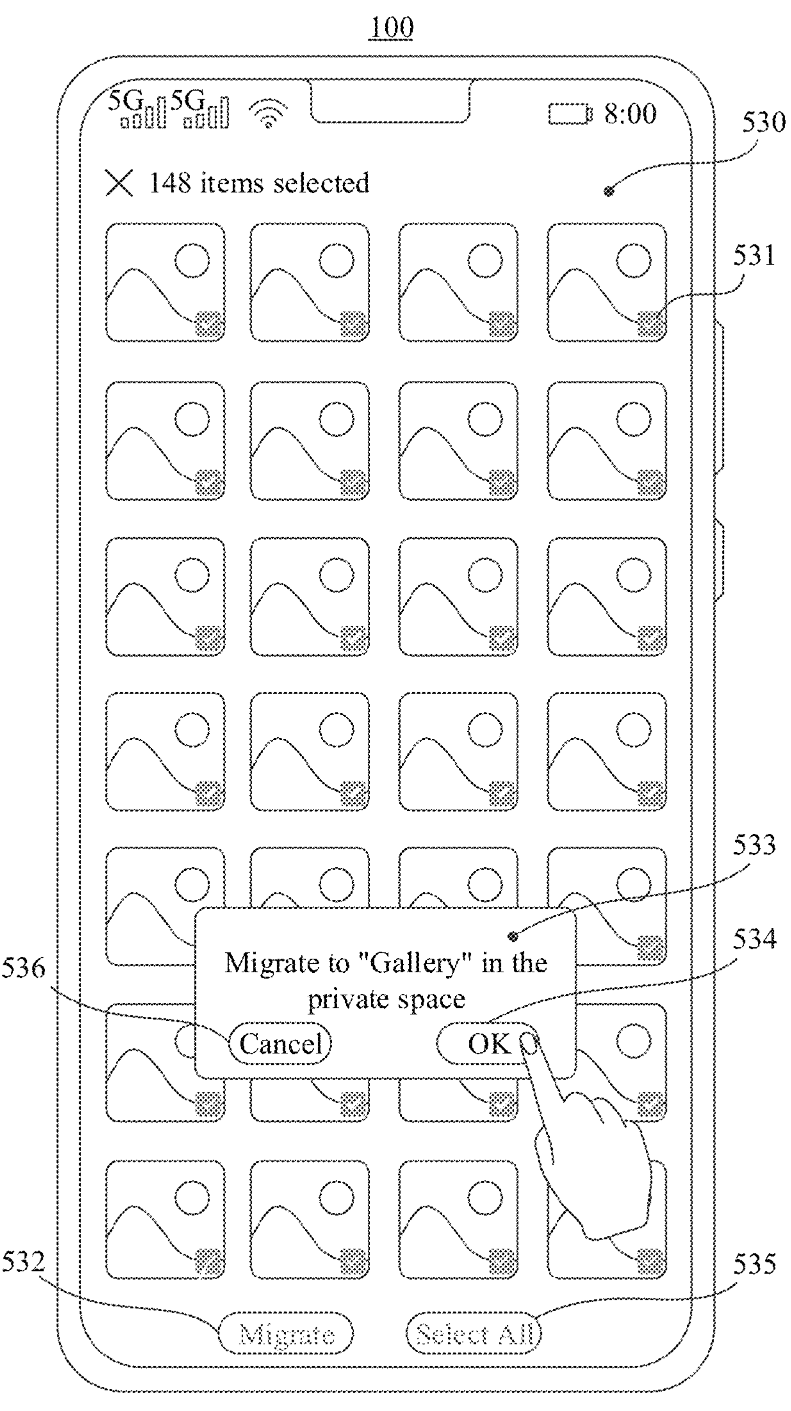

For example, after the user selects the picture 521 in the operating interface 520 for migration to the private space shown in FIG. 5B, the mobile phone 100 may display the picture selection interface 530 shown in FIG. 5C. The picture selection interface 530 shown in FIG. 5C is a file page in an original filesystem space in which the to-be-migrated picture file is located.

It may be understood that, if the file migration operation of the user is an operation of migrating a file in the main space to the private space, the mobile phone 100 may respond to the file migration operation to display a file page that is in the main space and that corresponds to the file that the user needs to migrate, for example, the picture file displayed in the picture selection interface 530 shown in FIG. 5C. If the file migration operation of the user is an operation of migrating a file in the private space to the main space, the mobile phone 100 responds to the file migration operation to display a file page that is in the private space and that corresponds to the file that the user needs to migrate. Details are not described herein.

It may be understood that in some other embodiments, the mobile phone 100 may first display, in response to the file migration operation of the user, the operating interface 520 shown in FIG. 5B. After the user selects a to-be-migrated file type in the displayed operating interface 520, the mobile phone 100 displays a file page of the corresponding file type. It may be understood that the file type that the user needs to migrate may include types such as a picture, a video, and audio. This is not limited herein.

405: Detect an operation in which the user selects a to-be-migrated specified file from the displayed file page and determines to migrate the selected specified file.

For example, the user may select a to-be-migrated file, that is, the specified file, from the file page displayed on the mobile phone 100 to migrate the to-be-migrated file. After detecting a migration confirmation operation of the user, the mobile phone 100 completes migration of the specified file from an original filesystem space to a target filesystem space.

For example, as shown in FIG. 5C, a picture (that is, a specified file) that needs to be migrated may be selected from the picture selection interface 530. A check mark 531 may be displayed in a lower right corner of the selected picture to indicate that the file is in a selected state. For a style of the check mark 531, refer to "√" shown in FIG. 5C. After selecting the picture that needs to be migrated, the user may tap a Migrate button 532. In this case, a migration confirmation box 533 shown in FIG. 5C may pop up on the mobile phone 100. The user may further tap an OK button 534 in the migration confirmation box 533 to complete migration of the selected picture file, and the mobile phone 100 may display a migration completion interface 540 shown in FIG. 5D. A quantity of files that need to be migrated and that are selected by the user may be further displayed in an upper left corner of the picture selection interface 530 shown in FIG. 5C, for example, "148 items selected" shown in FIG. 5C.

Still as shown in FIG. 5C, the user may alternatively tap an All button 535 in the picture selection interface 530 to select all pictures in the picture selection interface 530 (including pictures not displayed in the interface shown in FIG. 5C). Details are not described herein. In addition, in the migration confirmation box 533 displayed on the mobile phone 100 after the user taps the Migrate button 532 in FIG. 5C, the user may alternatively tap a Cancel button 536 to cancel the current migration operation.

It may be understood that in some other embodiments, interfaces displayed on the mobile phone 100 in response to the operation in which the user selects the to-be-migrated specified file from the displayed file page and determines to migrate the selected specified file may alternatively be in other interface forms. This is not limited herein.

406: Display a migration success prompt interface.

For example, after the user confirms, in the interface displayed on the mobile phone 100, the migration operation on the specified file, the specified file is successfully migrated from an original filesystem to a target filesystem. In this case, the mobile phone 100 may display the migration success prompt interface.

Figure 5D:
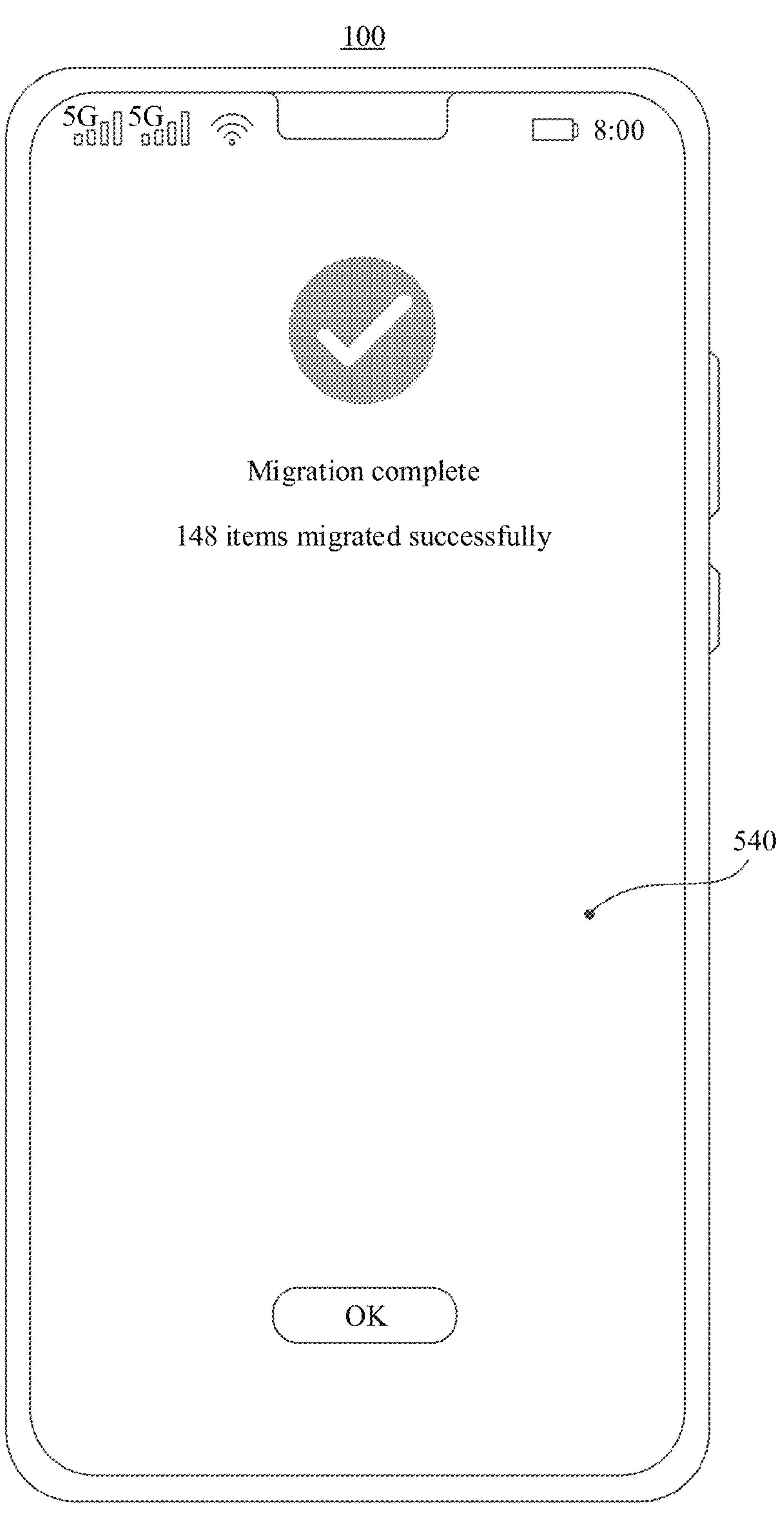

For example, after the user selects the specified file from the picture selection interface 530 shown in FIG. 5C and confirms migration, the mobile phone 100 may display the migration completion interface 540 shown in FIG. 5D. In some other embodiments, the migration success prompt interface displayed on the mobile phone 100 may alternatively be in another interface form. This is not limited herein.

It may be understood that, for example, if it is determined in step 402 that a current space of the mobile phone 100 is the private space specified to enable the migration permission, the mobile phone 100 may respond to the file migration operation of the user to complete a process of migrating a file from the main space to the private space or migrating a file from the private space to the main space. In other words, the target filesystem space receiving the specified file may be, for example, the main space or the private space.

407: Detect an operation in which the user opens the target filesystem space to view the migrated specified file.

For example, if the target filesystem space receiving the migrated specified file is the u0 user space, the operation in which the user opens the target filesystem space to view the migrated specified file may be opening an interface displaying the received specified file in the main space. For another example, if the target filesystem space receiving the migrated specified file is the u10 user space, the operation in which the user opens the target filesystem space to view the migrated specified file is, for example, an operation of running a corresponding application in the private space to open an interface displaying the received specified file.

Figure 5E:
Figure 5F:
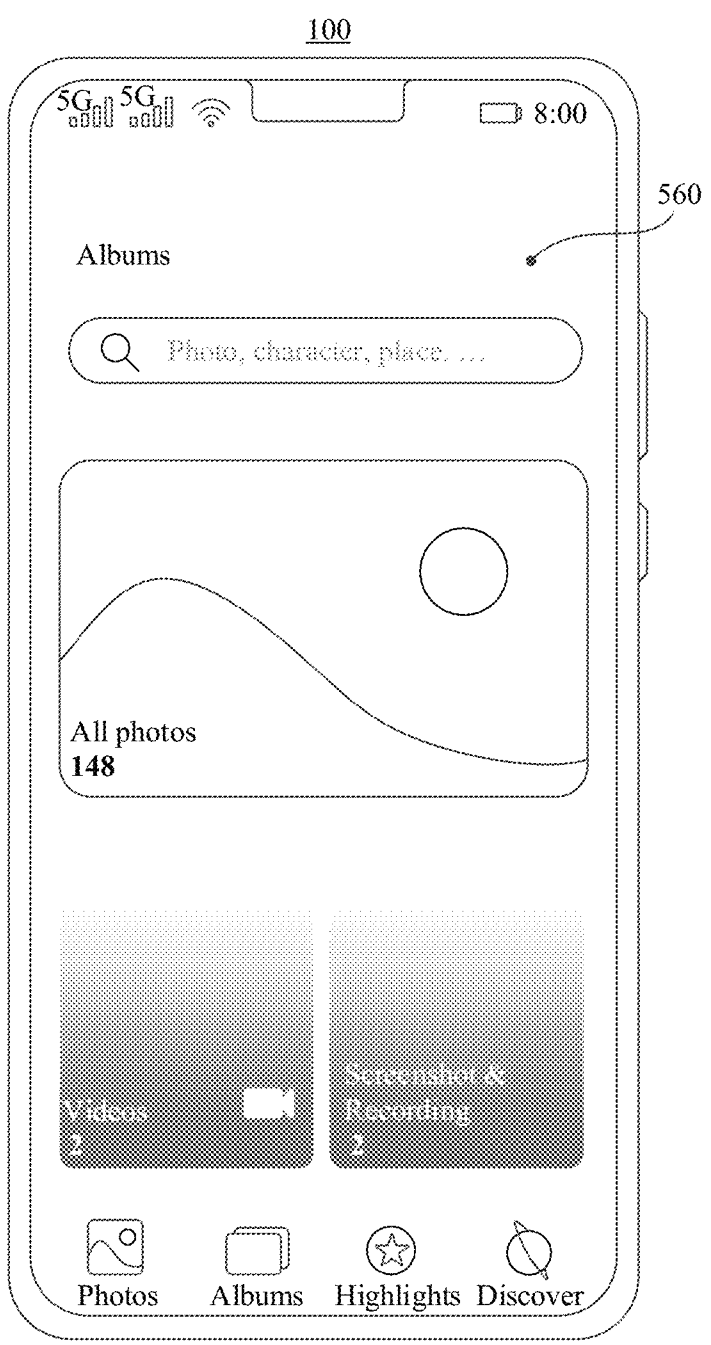

For example, after migration of the picture file selected by the user is completed by using the migration operation process shown in FIG. 5A to FIG. 5D, as shown in FIG. 5E, the user taps a gallery application icon 551 on the home screen 550 of the private space, so that the mobile phone 100 can open a gallery application in the private space, and the mobile phone 100 runs the gallery application and displays a gallery interface 560 shown in FIG. 5F.

408: Enter the target filesystem space and display the migrated file.

For example, in response to a user operation, the mobile phone 100 may run the target filesystem space and display the migrated file. As described above, the target filesystem space may be, for example, the u0 user space or the u10 user space. For example, the target filesystem space is the u10 user space. For an interface in which the mobile phone 100 runs, in response to a user operation in the private space, a corresponding application to display a received specified file, refer to the gallery interface 560 shown in FIG. 5F. As shown in FIG. 5F, “All photos 148” displayed in the gallery interface 560 are 148 pictures that are migrated from the main space to the private space by using the migration operations in FIG. 5A to FIG. 5D.

It may be understood that in some other embodiments, if a file specified by the user to be migrated is another type of file, for example, audio or a contact, the mobile phone 100 may display a file display interface corresponding to the specified file type. This is not limited herein.

409: Display an operation failure prompt interface.

For example, in the determining process in step 402 or 403, if it is determined that the file migration operation of the user is not an operation authorized and allowed by the system of the mobile phone 100, that is, the file migration operation is an invalid operation, the mobile phone 100 may display the operation failure prompt interface. For example, the prompt interface is an interface in which the mobile phone 100 displays a pop-up window to prompt an operation failure, or may be an interface in another form. This is not limited herein.

It may be understood that the process in which the mobile phone 100 performs step 401 to step 409 to implement the file migration method in this application is implemented based on interaction between parts in the operating system of the mobile phone 100.

Therefore, to describe a specific implementation process of the solution in this application more clearly, the following describes the specific implementation process of the solution in this application from another perspective with reference to a schematic flowchart of interaction between the parts in the system of the mobile phone 100.

Figure 6:
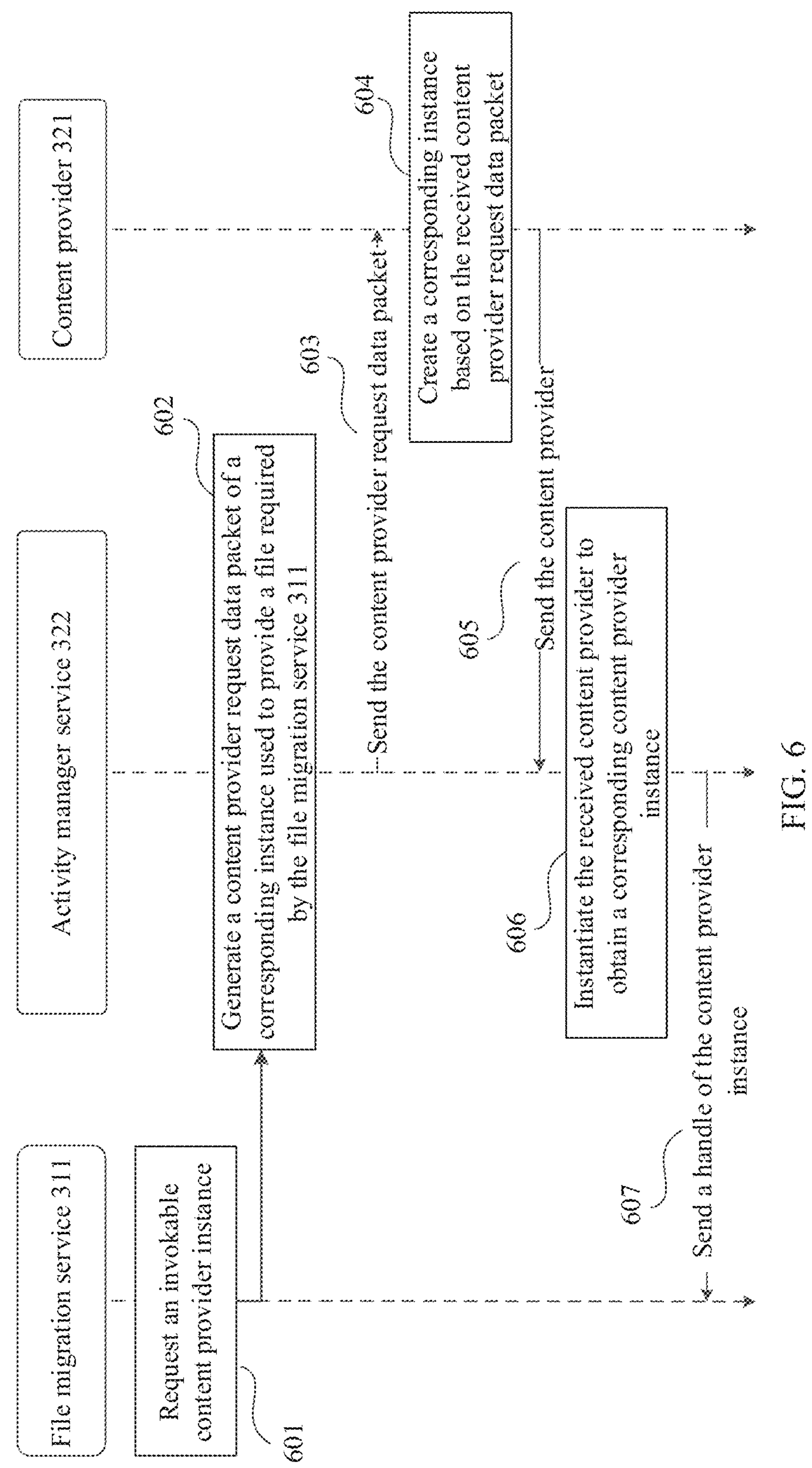
FIG. 6 is a schematic flowchart of interaction between parts in a system of a mobile phone 100 in a process of implementing a file migration method according to an embodiment of this application.

FIG. 6 is a schematic flowchart of interaction between parts in a system of a mobile phone 100 in a process of implementing a file migration method in this application according to an embodiment of this application.

As shown in FIG. 6, the interaction procedure includes the following steps.

601: A file migration service 311 requests an invokable content provider instance. For ease of description, the file migration service 311 requesting the instance may be referred to as an “invoker” below:

For example, when the system of the mobile phone 100 performs a file migration operation performed by a user by using the file migration service 311, the file migration service 311 needs to obtain a file migration permission on an original filesystem space of a specified file. Therefore, a file access request of the file migration service 311 may be used to request to obtain a migration permission on a file in the original filesystem space.

For example, when requesting the invokable content provider instance, the file migration service 311 may send a request by using, for example, a get( ) function. Refer to “getContentResolver( ).query(uri,projection,null,null,null)”, where “( )” after “query” may indicate related information of the requested content provider instance, for example, the related information includes an invoking address of the requested invokable content provider instance. Details are not described herein.

It may be understood that the file migration service 311 may obtain a content provider instance that is in the original filesystem space and that can be invoked by the file migration service 311, to obtain the migration permission on the file in the original filesystem space. Therefore, the file migration service 311 may directly request the invokable content provider instance by using an Activity manager service 322. As described above, the original file space system may be, for example, a main space created at delivery of the mobile phone 100, or a private space created by the user on the mobile phone 100. This is not limited herein.

602: The Activity manager service 322 generates, in response to the instance request of the file migration service 311, a content provider request data packet of a content provider instance used to provide a file required by the file migration service 311. When determining that the instance request meets a preset response condition, the Activity manager service 322 may generate a request data packet corresponding to a content provider instance in a filesystem space (for example, a u0 user space) of the file required by the file migration service 311. When determining that the instance request does not meet the preset response condition, the Activity manager service 322 may send a request data packet of a content provider in a filesystem space (for example, a u10 user space) in which the file migration service 311 is located. In addition, the request data packet generated by the Activity manager service 322 may include description information of a content provider required by the file migration service 511, and the like.

For example, the file migration service 311 requests, by using the Activity manager service 322, a corresponding content provider instance used to access a file in an original filesystem space in which a specified file is located. The Activity manager service 322 may generate a content provider request data packet of the content provider instance based on the instance request of the file migration service 311. The request data packet includes at least description information used to describe data such as a filesystem space user ID that needs to be provided by the required content provider, and the like. This is not limited herein. It may be understood that, in a process of performing file migration by the file migration service 311 running in the private space, regardless of whether to migrate a file from the main space to the private space or migrate a file in the private space to the main space, the file migration service 311 needs to obtain a permission on operations access, duplication, or deletion of file data or the like in the main space.

It may be understood that, when determining whether the request of the file migration service 311 for the content provider instance meets the preset response condition, the Activity manager service 322 may determine whether a space running the file migration service 311 is a space (for example, the private space) specified to enable a migration permission, and determine whether the file migration service 311 is an application specified to enable the migration permission, to determine whether the preset response condition is met. It may be understood that, before generating the content provider request data packet of the content provider instance, the Activity manager service 322 may first search, based on a determining result, an instance cache pool of the system for whether there is a content provider instance. If there is a content provider instance, the Activity manager service 322 may directly return the found instance to the file migration service 311. In this case, the Activity manager service 322 no longer needs to generate an instance request data packet to request a content provider 321 to create a content provider. After receiving a corresponding content provider returned by the content provider 321, the Activity manager service 322 instantiates the received content provider, and finally sends an instantiated content provider to the file migration service 311. A specific determining process performed by the Activity manager service 322 and a specific process in which the Activity manager service 322 queries the instance cache pool based on the determining result are specifically described below with reference to another flowchart. Details are not described herein.

603: The Activity manager service 322 sends the generated content provider request data packet to the content provider 321.

For example, the Activity manager service 322 may send the generated instance request data packet to the content provider 321 when determining that the instance cache pool of the system has no content provider instance to feed back to the file migration service 311, to request the content provider 321 to create a content provider instance.

604: The content provider 321 creates a content provider of the content provider instance based on the received content provider request data packet.

For example, after receiving the instance request data packet sent by the Activity manager service 322, the content provider 321 creates a content provider corresponding to the content provider instance, and returns the content provider to the Activity manager service 322.

605: The content provider 321 sends the created content provider to the Activity manager service 322.

606: The Activity manager service 322 instantiates the received content provider to obtain a corresponding content provider instance.

For example, after receiving the content provider returned by the content provider 321, the Activity manager service 322 may instantiate the content provider, that is, bind the received content provider to corresponding invoker information and configure a corresponding invoking parameter, so that the content provider can be invoked by a corresponding invoker, for example, the invoker may be the file migration service 311. After being instantiated, the content provider can be invoked by the file migration service 311 to access a file in a corresponding filesystem space.

For example, in an Android operating system equipped in the mobile phone 100 to which a FUSE filesystem is used, in the process in steps 602 to 606 in which the Activity manager service 322 returns the content provider instance in response to the instance request of the file migration service 311, a process in which the Activity manager service 322 performs data conversion and instantiates the received content provider may include the following: (1) The Activity manager service 322 first generates a ContextImpl type request file in response to the instance request of the file migration service 311. (2) The Activity manager service 322 further queries a content provider instance in the instance cache pool by using various invoking functions (for example, a "query " function and an "acquire" function), or generates an instance request data packet that includes content provider instance description information, to apply to the content provider 321 for creation of a content provider of the content provider instance. (3) The Activity manager service 322 may further request, by using an Activity thread (activity thread), invoker information from an application thread (application thread) corresponding to the file migration service 311, that is, request an identity document (Identity Document, ID) of the file migration service 311, and package the obtained invoker information on a content provider returned by the content provider 321 in response to the creation request, to bind an invoking relationship between the requested content provider and an invoker, so as to instantiate the content provider. A process of creating the content provider by the content provider 321 and a process in which the Activity manager service 322 obtains the content provider created by the content provider 321, instantiates the content provider, and then returns a handle of the content provider instance to the file migration service 311 are described in detail below; and details are not described herein.

It may be understood that in some other embodiments, a data conversion process in a process of responding to the instance request of the file migration service 311 by the Activity manager service 322 may alternatively include another conversion manner. This is not limited herein.

607: The Activity manager service 322 sends a handle of the content provider instance to the file migration service 311.

For example, after completing the process of instantiating the received content provider, the Activity manager service 322 may send an invoking handle of the instantiated content provider (that is, the content provider instance) to the file migration service 311. Then, the file migration service 311 can invoke the instance based on the handle.

For example, if an instance returned by the Activity manager service 322 to the file migration service 311 is obtained after a content provider created by the content provider 321 in the main space is instantiated, the file migration service 311 may invoke, by using a handle of the instance, the instance to access file data in the main space, and duplicate, delete, or perform another operation on a file in the main space, to complete a file migration process.

For the execution process in step 602 to step 607, with reference to another flowchart, an example in which a specified file is migrated from the main space to the private space of the mobile phone 100 is used below to describe in detail the determining process performed after the Activity manager service 322 responds to the instance request of the file migration service 311 (an invoker), and a process in which the instance cache pool is queried based on the determining result to obtain the content provider instance, or the content provider in the main space is invoked to create a content provider of the content provider instance, and the created content provider is further instantiated and then an instantiated content provider is returned to the file migration service 311.

Figure 7:
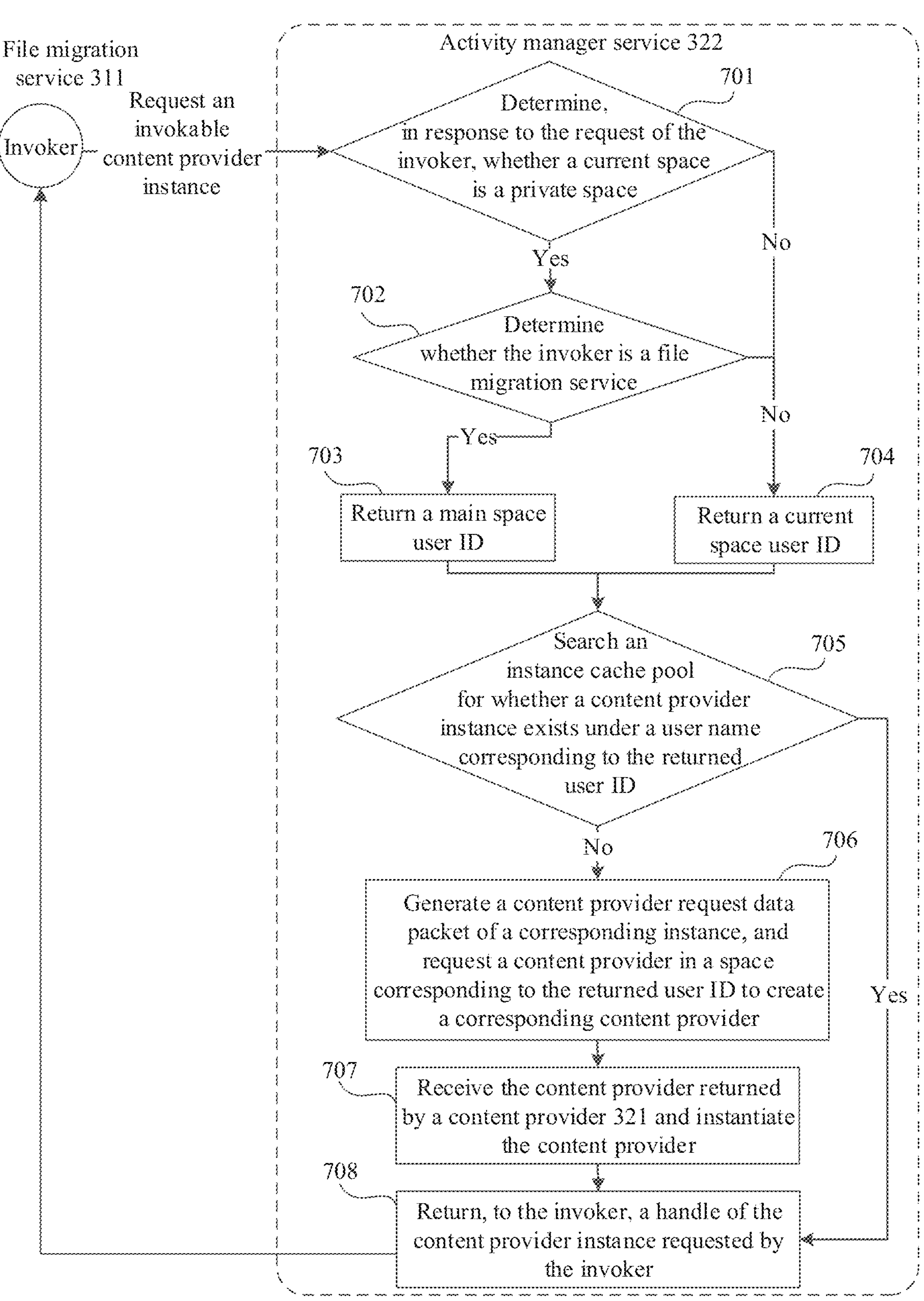
FIG. 7 is a schematic flowchart of execution of a process, in a process of implementing a file migration method, in which an Activity manager service 322 in a system of a mobile phone 100 returns a handle of a content provider instance in response to an invoking request of a file migration service 311 according to an embodiment of this application.

FIG. 7 is a schematic flowchart of execution of a process, in a process of implementing a file migration method in this application, in which an Activity manager service 322 in a system of a mobile phone 100 returns a handle of a content provider instance in response to an invoking request of a file migration service 311 according to an embodiment of this application. It may be understood that, steps in the procedure shown in FIG. 7 all are performed by the Activity manager service 322 in the system of the mobile phone 100, and execution bodies of the steps are no longer repeatedly described in the following description of the steps.

As shown in FIG. 7, the procedure includes the following steps.

701: Determine, in response to a request of an invoker, whether a current space is a private space. The private space is a space specified to enable a migration permission. If a determining result is "yes", the Activity manager service 322 may continue to perform the following step 702 to further determine whether a content provider instance in a main space needs to be obtained and returned to the invoker. If the determining result is "no", the Activity manager service 322 performs the following step 704 to return a current space user ID of the mobile phone 100.

For example, when the file migration service 311 (the invoker) performs a file migration operation of a user, if a to-be-migrated specified file is a file in the main space, the Activity manager service 322 needs to first determine, in response to an invoking request of the file migration service 311, whether a current space of the mobile phone 100 is the private space, to determine whether the content provider instance in the main space needs to be returned. For a specific determining process in this step, refer to related descriptions in the foregoing step 402. Details are not described herein again.

702: Determine whether the invoker is a file migration service. If a determining result is "yes", it may be determined that the invoker may obtain a file migration permission on the main space, and may return a main space user ID to a management module in the Activity manager service 322. If the determining result is "no", it may be determined that the invoker cannot obtain the file migration permission on the main space, and therefore can return only the current space user ID to the management module in the Activity manager service 322.

For example, when determining that the current space of the mobile phone 100 is the private space, the Activity manager service 322 may further determine whether the invoker is the file migration service, where the file migration service running in the private space is an application specified to enable a migration permission. For a specific determining process in this step, refer to related descriptions in the foregoing step 403. Details are not described herein again.

It may be understood that an execution sequence of the foregoing step 701 and the current step 702 described in this embodiment of this application, and the foregoing steps 402 and 403 may be performed simultaneously or separately in sequence. This is not limited herein.

703: Return the main space user ID. After this step, the following step 705 continues to be performed.

For example, when it is determined that the invoker can obtain the file migration permission on the main space, the Activity manager service 322 may, for example, return the main space user ID to the management module in the service, to obtain the content provider instance in the main space.

704: Return the current space user ID. After this step, the following step 705 continues to be performed.

For example, when it is determined that the invoker cannot obtain the file migration permission on the main space, the Activity manager service 322 may, for example, return the current space user ID to the management module in the service, to obtain a content provider instance in the current space.

It may be understood that in this embodiment of this application, the current space may be, for example, the private space. In some other embodiments, the current space may alternatively be another space other than the main space and the private space. This is not limited herein.

705: Search an instance cache pool for whether a content provider instance exists under a user name corresponding to the returned user ID. If a determining result is "yes", the Activity manager service 322 obtains the instance under the space name and returns the instance to the invoker, that is, performs the following step 708. If the determining result is "no", the Activity manager service 322 needs to request a content provider in the space to create a content provider of the content provider instance, that is, performs the following step 706.

For example, the Activity manager service 322 may query, in the instance cache pool in the service, the content provider instance requested by the invoker. It may be understood that the instance cache pool in the Activity manager service 322 stores an invokable content provider instance that is under each space user name and that corresponds to each application. If the space user name is the main space user ID, the Activity manager service 322 may query each instance under the main space user name in the instance cache pool. If the instance requested by the invoker can be found, the Activity manager service 322 may return a handle of the found instance to the invoker. If the space user name is the current space user ID, and the current space is, for example, the private space, the Activity manager service 322 may query each instance under the private space user name in the instance cache pool. If the instance requested by the invoker can be found, the Activity manager service 322 may return a handle of the found instance to the invoker.

706: Generate a content provider request data packet of a corresponding instance, and request a content provider in a space corresponding to the returned user ID to create a corresponding content provider.

For example, if the Activity manager service 322 finds no content provider instance under the main space name in the instance cache pool in the service, the Activity manager service 322 needs to request the content provider in the main space to create a content provider of the content provider instance. For example, the Activity manager service 322 may generate a content provider request data packet of the content provider instance, and send the content provider request data packet to the content provider in the main space to request to create the content provider of the content provider instance. For details, refer to related descriptions in the foregoing step 602. Details are not described herein again.

707: Receive a content provider returned by the content provider 321 and instantiate the content provider.

For example, after receiving the request data packet sent by the Activity manager service 322, the content provider in the main space may create the content provider of the content provider instance based on description information in the data packet, and return the content provider to the Activity manager service 322. After receiving the content provider returned by the content provider, the Activity manager service 322 may instantiate the content provider. For a specific instantiation process, refer to related descriptions in the foregoing step 606. Details are not described herein again.

708: Return, to the invoker, a handle of the content provider instance requested by the invoker.

For example, after completing a process of instantiating the received content provider, the Activity manager service 322 returns the handle of the content provider instance to the invoker (for example, the file migration service 311). The file migration service 311 may invoke the content provider instance, for example, a content provider instance corresponding to the file migration service in the main space, based on the returned handle, to obtain a to-be-migrated specified file in the main space. For details, refer to related descriptions in the foregoing step 607. Details are not described herein again.

It may be understood that, in a system running process of the mobile phone 100, the Activity manager service 322 may be started by using an Activity thread, obtain a content provider instance request of the file migration service 311 by using the Activity thread, and return a handle of a content provider instance to the file migration service 311 by using the Activity thread.

Therefore, to describe implementation logic of the solution in this application more clearly, the following continues to describe in detail, with reference to another flowchart, a process of interaction between the file migration service 311, the Activity manager service 322, and an Activity thread 3221 in the system of the mobile phone 100 in a process of implementing the file migration method in this application.

Figure 8A:
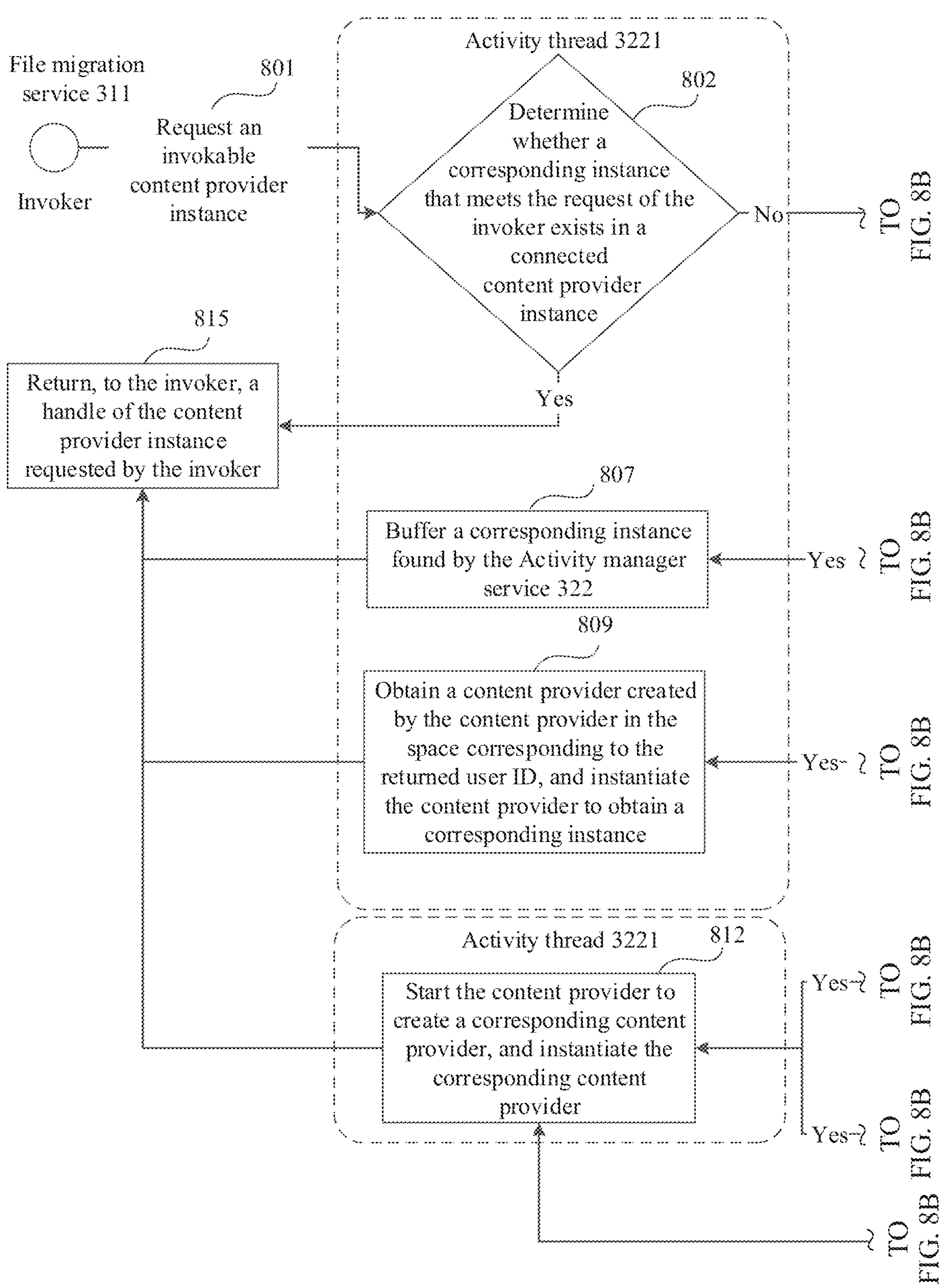
FIG. 8A and FIG. 8B are a schematic flowchart of execution of interaction between a file migration service 311, an Activity manager service 322, and an Activity thread 3221 in a process of implementing a file migration method in this application according to an embodiment of this application.
Figure 8B:
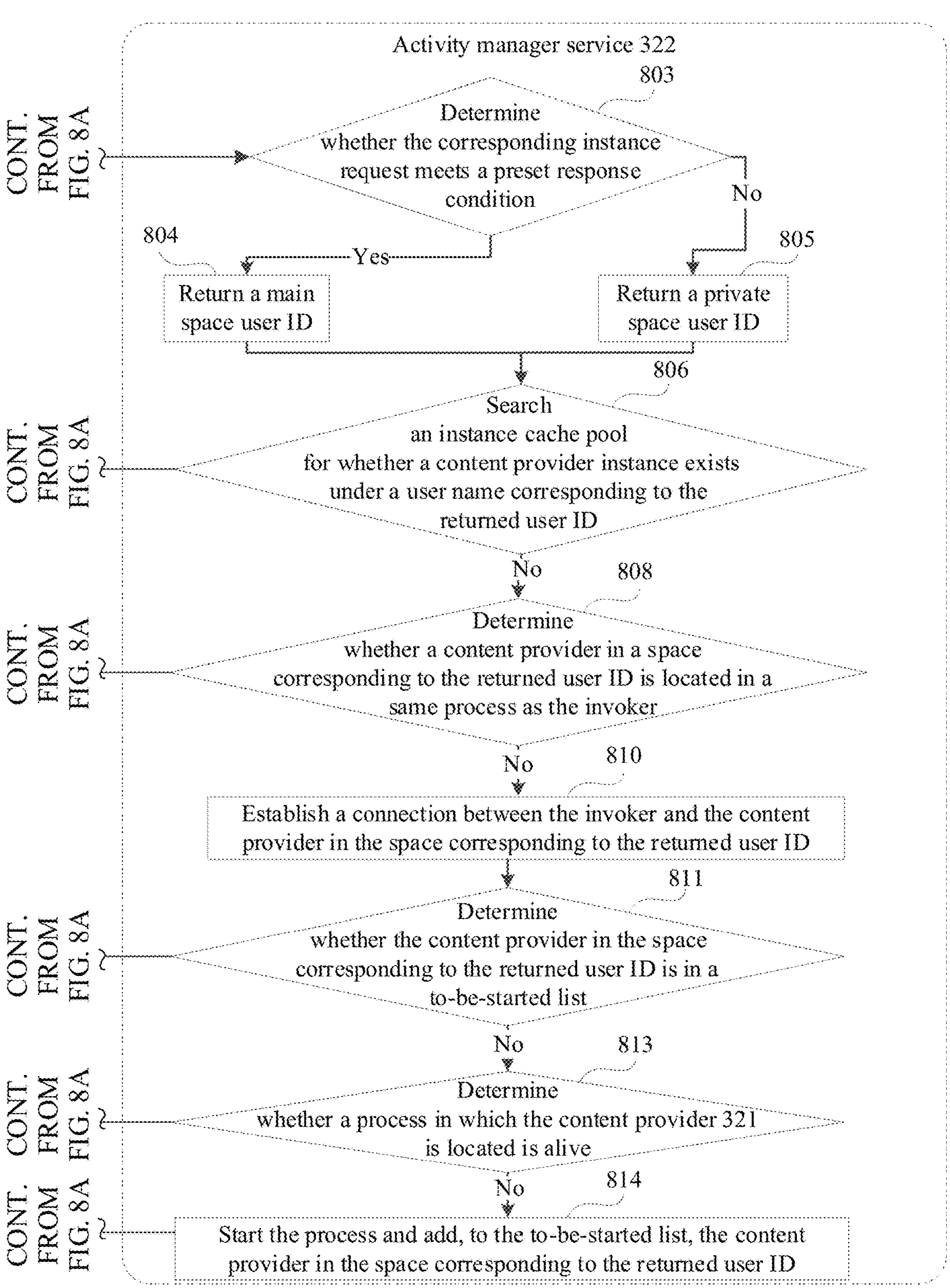

FIG. 8A and FIG. 8B are a schematic flowchart of execution of interaction between a file migration service 311, an Activity manager service 322, and an Activity thread 3221 in a system of a mobile phone 100 in a process of implementing a file migration method in this application.

As shown in FIG. 8A and FIG. 8B, the interaction execution procedure includes the following steps.

801: The file migration service 311 requests an invokable content provider instance.

For example, the file migration service 311 (for example, an invoker) generates a content provider instance request in response to a file migration operation of a user, to request a content provider instance that can provide a to-be-migrated file resource. It may be understood that, the content provider instance requested by the file migration service 311 is a content provider instance obtained after a content provider created by a content provider 321 in a main space is instantiated. For a specific operation process in which the file migration service 311 requests the content provider instance, refer to related descriptions in the foregoing step 601. Details are not described herein again.

802: The Activity thread 3221 determines whether a content provider instance that meets the request of the invoker exists in a connected content provider instance. If a determining result is "yes", the Activity thread 3221 may directly perform step 815. If the determining result is "no", the Activity thread 3221 may return, to the Activity manager service 322, the determining result indicating that there is no content provider instance, and the Activity manager service 322 continues to perform the following step 803.

For example, the Activity thread 3221 first performs matching in a stored content provider instance resource in a connected process based on related information of the content provider instance requested by the file migration service 311, to determine whether the content provider instance requested by the file migration service 311 exists. It may be understood that the content provider instance matched by the Activity thread 3221 is a content provider instance obtained after the content provider created by the content provider 321 in the main space is instantiated. If the content provider instance exists, it indicates that the file migration service 311 has invoked the content provider instance, and a handle of the matched content provider instance can be directly returned to the file migration service 311. If the content provider instance does not exist, it indicates that the file migration service 311 invokes the content provider instance for the first time, and the following step 803 needs to be performed to determine whether the file migration service 311 has a permission to obtain a content provider in the main space, that is, determine whether the invoker has a file migration permission. Details are not described herein again.

803: The Activity manager service 322 determines whether the content provider instance request meets a preset response condition. If a determining result is "yes", it indicates that the Activity manager service 322 can obtain a corresponding content provider instance in the main space to return the corresponding content provider instance to the invoker, and the following step 804 can continue to be performed. If the determining result is "no", it indicates that the Activity manager service 322 cannot obtain the corresponding content provider instance in the main space to return the corresponding content provider instance to the invoker, the following step 805 is performed.

For example, that the Activity manager service 322 determines whether the content provider instance request meets a preset response condition includes: determining whether a current space running the file migration service 311 is a private space (or determining whether a current user is a private space user), and determining whether the invoker requesting the content provider instance is the file migration service 311 in the private space. When it is determined that the current space running the file migration service 311 is the private space and the invoker requesting the content provider instance is the file migration service 311 in the private space, the following step 804 continues to be performed to return a main space user ID. If the current space running the file migration service 311 is not the private space or the invoker requesting the content provider instance is not the file migration service 311 in the private space, the following step 805 continues to be performed to return a current space user ID. For details, refer to related descriptions in the determining processes in the foregoing step 701 and step 702. Details are not described herein again.

804: The Activity manager service 322 returns the main space user ID. It may be understood that step 804 is the same as step 703, and details are not described herein again.

805: The Activity manager service 322 returns a private space user ID. It may be understood that a difference between step 805 and the foregoing step 704 lies in the following: The current step 805 is described based on that the current space is the private space, and therefore is directly described as that the Activity manager service 322 returns the private space user ID to a management module in the service. Details are not described herein.

806: The Activity manager service 322 searches an instance cache pool for whether a content provider instance exists under a user name corresponding to the returned user ID. If a determining result is "yes", a handle of a found content provider instance can be directly returned to the file migration service 311 by using the Activity thread 3221, that is, the following step 807 is performed. If the determining result is "no", the content provider 321 needs to be invoked to create a corresponding content provider, that is, the following steps 808 to 814 are performed.

It may be understood that, for a process in which the Activity manager service 322 searches the instance cache pool for whether a content provider instance under a main space user name or a private space user name corresponding to the returned user ID exists, refer to related descriptions in the foregoing step 705. Details are not described herein again.

807: The Activity thread 3221 buffers a content provider instance found by the Activity manager service 322.

For example, in the foregoing step 806, if the Activity manager service 322 finds, in the instance cache pool, the content provider instance under the returned main space user name, the Activity thread 3221 may obtain and buffer the content provider instance under the main space user name. Afterwards, the Activity thread 3221 may return a handle of the buffered content provider instance under the main space user name to the file migration service 311, that is, the following step 815 may continue to be performed after the current step 807.

Correspondingly, if the Activity manager service 322 returns the private space user ID, in the foregoing step 806, if the Activity manager service 322 finds, in the instance cache pool, the content provider instance under the private space user name, the Activity thread 3221 may also obtain and buffer the content provider instance under the private space user name. Afterwards, the Activity thread 3221 may return a handle of the content provider instance under the buffered private space user name to the file migration service 311, that is, the following step 815 may continue to be performed after the current step 807. It may be understood that, the file migration service 311 can only access a file in the private space by invoking the content provider instance under the private space user name. If the file migration service 311 needs to access a file in the main space, the file migration service 311 needs to obtain the content provider instance under the main space user name.

808: The Activity manager service 322 determines whether a content provider in a space corresponding to the returned user ID is located in a same process as the invoker. If a determining result is "yes", the following step 809 continues to be performed. If the determining result is "no", the following step 810 continues to be performed.

For example, in the foregoing step 806, if the Activity manager service 322 does not find, in the instance cache pool, the content provider instance under the user name corresponding to the returned main space user ID, or does not find the content provider instance under the user name corresponding to the returned private space user ID, a procedure for creating a content provider needs to be started, including: The Activity manager service 322 first determines whether the content provider in the space corresponding to the returned user ID is located in a same process as the invoker. For example, if the returned user ID is the main space user ID, the Activity manager service 322 determines whether the content provider 321 in the main space is located in a same process as the invoker, namely, the file migration service 311. If the content provider 321 and the file migration service 311 are located in a same process, the content provider 321 in the main space may directly create a content provider and return the content provider to the Activity thread 3221 in the Activity manager service 322, that is, the following step 809 can continue to be performed. If the content provider 321 and the file migration service 311 are not located in a same process, a connection between the content provider 321 in the main space and the file migration service 311 needs to be established, that is, the following step 810 needs to be performed.

809: The Activity thread 3221 obtains a content provider created by the content provider in the space corresponding to the returned user ID, and instantiates the content provider to obtain a corresponding instance. After the current step 809 is performed, the Activity thread 3221 may continue to perform the following step 815 to feed back, to the invoker, a handle of the content provider instance requested by the invoker.

For example, if the returned user ID is the main space user ID, and it is determined in the foregoing step 808 that the content provider 321 in the main space is located in a same process as the invoker, namely, file migration service 311, the Activity thread 3221 may obtain a content provider created by the content provider 321 in the main space in the same process, and instantiate the obtained content provider to obtain a content provider instance in the main space, so as to continue to perform the following step 815 to feed back, to the invoker, the handle of the content provider instance requested by the invoker.

810: The Activity manager service 322 establishes a connection between the invoker and the content provider in the space corresponding to the returned user ID.

For example, if the returned user ID is the main space user ID, and it is determined in the foregoing step 808 that the content provider 321 in the main space is not located in a same process as the invoker, namely, the file migration service 311, the Activity manager service 322 needs to establish a connection between the content provider 321 and the file migration service 311, that is, the file migration service 311 is created as a connection object of the content provider 321 in the main space, so as to expose file data in the main space to the file migration service 311 by using the content provider 321 in the main space. Details are not described herein.

811: The Activity manager service 322 determines whether the content provider in the space corresponding to the returned user ID is in a to-be-started list. If a determining result is "yes". the following step 812 continues to be performed. If the determining result is "no", the following step 813 continues to be performed.

For example, if the returned user ID is the main space user ID. When the connection between the content provider 321 in the main space and the file migration service 311 is established, the Activity manager service 322 needs to determine whether the content provider 321 in the main space is in a startup list in this case. If the content provider 321 is in the startup list. the Activity manager service 322 may invoke the Activity thread 3221 to start the content provider to create a corresponding content provider, that is, continue to perform the following step 812. If the content provider 321 is not in the startup list, the following step 813 needs to be performed to continue to determine whether a process in which the content provider 321 is located is running.

812: The Activity thread 3221 starts the content provider to create a corresponding content provider, and instantiates the corresponding content provider. After the current step 812 is performed, the Activity thread 3221 may continue to perform the following step 815 to feed back, to the invoker, the handle of the content provider instance requested by the invoker.

For example, the returned user ID is the main space user ID. In the foregoing step 811. if the Activity manager service 322 determines that the content provider 321 in the main space has been in the startup list in this case, the Activity thread 3221 may directly start the content provider 321 in the main space to create a content provider, and the Activity thread 3221 further instantiates the content provider created by the content provider 321 in the main space. Afterwards, the Activity thread 3221 may continue to perform the following step 815 to feed back, to the invoker, the handle of the content provider instance requested by the invoker.

813: The Activity manager service 322 determines whether a process in which the content provider 321 is located is alive. If a determining result is "yes", the foregoing step 812 is performed. If the determining result is "no", the following step 814 needs to be performed.

For example, the returned user ID is the main space user ID. In the foregoing step 811, if the Activity manager service 322 determines that the content provider 321 in the main space is not in the startup list in this case, the Activity manager service 322 needs to learn whether the process in which the content provider 321 in the main space is currently located is still running. that is, whether the process is alive. If the process in which the content provider 321 in the main space is currently located is still running, for example, when the content provider 321 in the main space is being located in a same process as another application in this case, the Activity thread 3221 can still access the process in which the content provider 321 in the main space is located, and start the content provider 321 in the main space to create a content provider, that is, continue to perform the foregoing step 812. If the process in which the content provider 321 in the main space is currently located has stopped running, the Activity manager service 322 needs to start the process and add the content provider 321 in the main space to the startup list, that is, needs to perform the following step 814.

814: The Activity manager service 322 starts the process and adds, to the to-be-started list, the content provider in the space corresponding to the returned user ID. After the current step 814 is performed, the Activity thread 3221 may continue to perform the foregoing step 812, to start the content provider to create a corresponding content provider and instantiate the corresponding content provider.

For example, the returned user ID is the main space user ID. In the foregoing step 813, if the Activity manager service 322 determines that the process in which the content provider 321 in the main space is currently located has stopped running, the Activity manager service 322 needs to start a process, and adds the content provider 321 in the main space to the startup list. Afterwards, the Activity thread 3221 continues to perform the foregoing step 812 to start the content provider 321 in the main space to create a corresponding content provider and instantiate the corresponding content provide. Details are not described herein again.

815: The Activity thread 3221 returns, to the invoker, the handle of the content provider instance requested by the invoker.

It may be understood that, if it is determined in the foregoing step 803 that the corresponding instance request meets the preset response condition, after step 804 is performed to return the main space user ID, the content provider instance that is in the main space and that is requested by the file migration service 311 may be returned to the file migration service 311 after the process in the foregoing steps 806 to 815 is performed. In this way, the file migration service 311 can access a file in the main space to migrate a specified file from the main space to the private space. If it is determined in the foregoing step 803 that the corresponding instance request does not meet the preset response condition, after step 805 is performed to return the private space user ID, the Activity thread 3221 returns a content provider instance in the private space to the file migration service 311 after the process in the foregoing steps 806 to 815 is performed. In this case, the file migration service 311 cannot access a file in the main space, and therefore cannot complete a file migration process.

In this application, a file migration request that meets the preset response condition or that is of a specified application in a specified space specified to enable a migration permission is redirected to a corresponding content provider instance requested by a content provider in a space in which a to-be-migrated file is located, to finally complete the file migration process. The file migration process can be completed under user-based management of a filesystem in user space, to meet a file migration requirement of a user, so that security is high. In addition, system running burden of the mobile phone 100 is not increased, and user experience is also good.

It may be understood that in some other embodiments, when implementing the file migration method in this application, the mobile phone 100 may migrate a specified file in the private space to the main space. For related interfaces displayed on the mobile phone 100 in the file migration process, refer to FIG. 9A to FIG. 9F.

FIG. 9A to FIG. 9F are schematic diagrams of some interfaces displayed on the mobile phone 100 in a process of migrating a file in a private space to a main space.

Figure 9A:
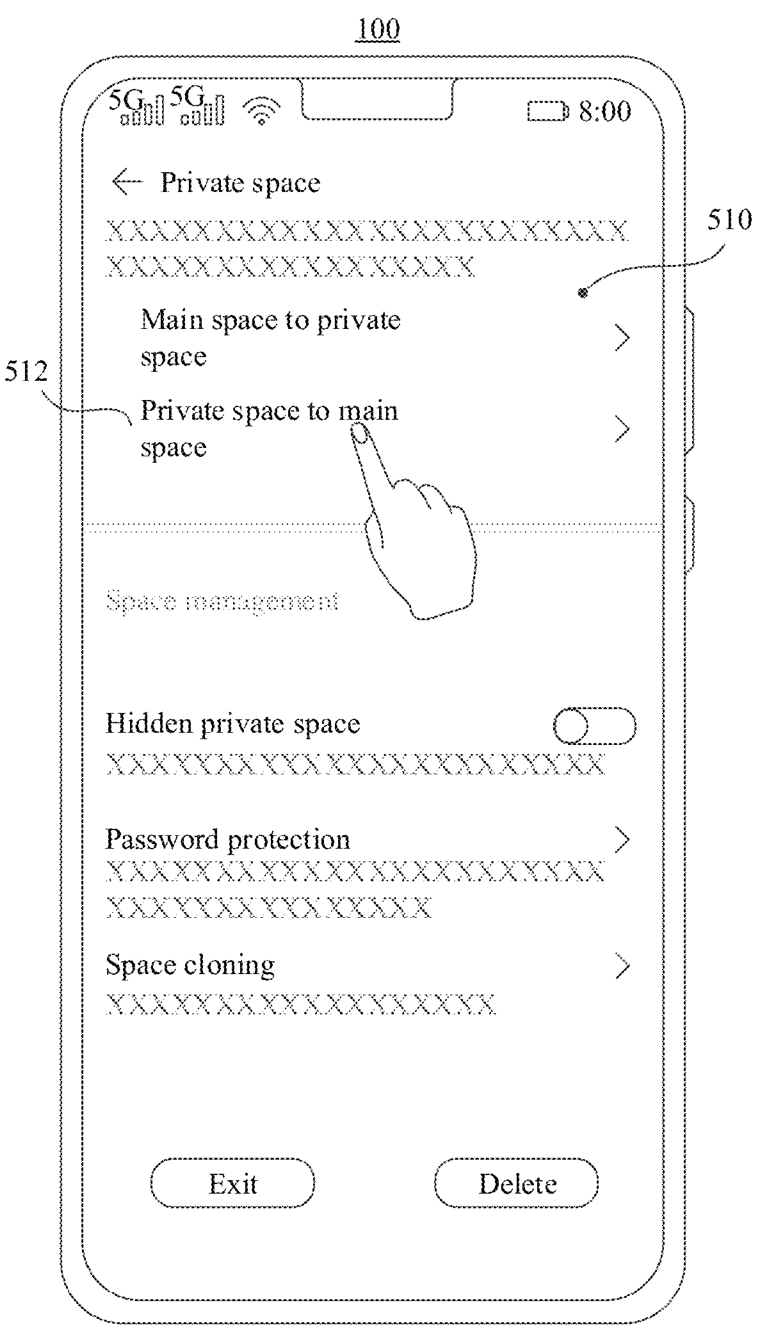
FIG. 9A to FIG. 9F are schematic diagrams of some interfaces displayed on a mobile phone 100 in a process of migrating a file in a private space to a main space according to an embodiment of this application.

After a user operates the mobile phone 100 to enter the private space, the user may operate the mobile phone 100 to open a private space management interface 510 shown in FIG. 9A. The private space management interface 510 shown in FIG. 9A is the same as the interface shown in FIG. 5A, and details are not described herein again.

Figure 9B:
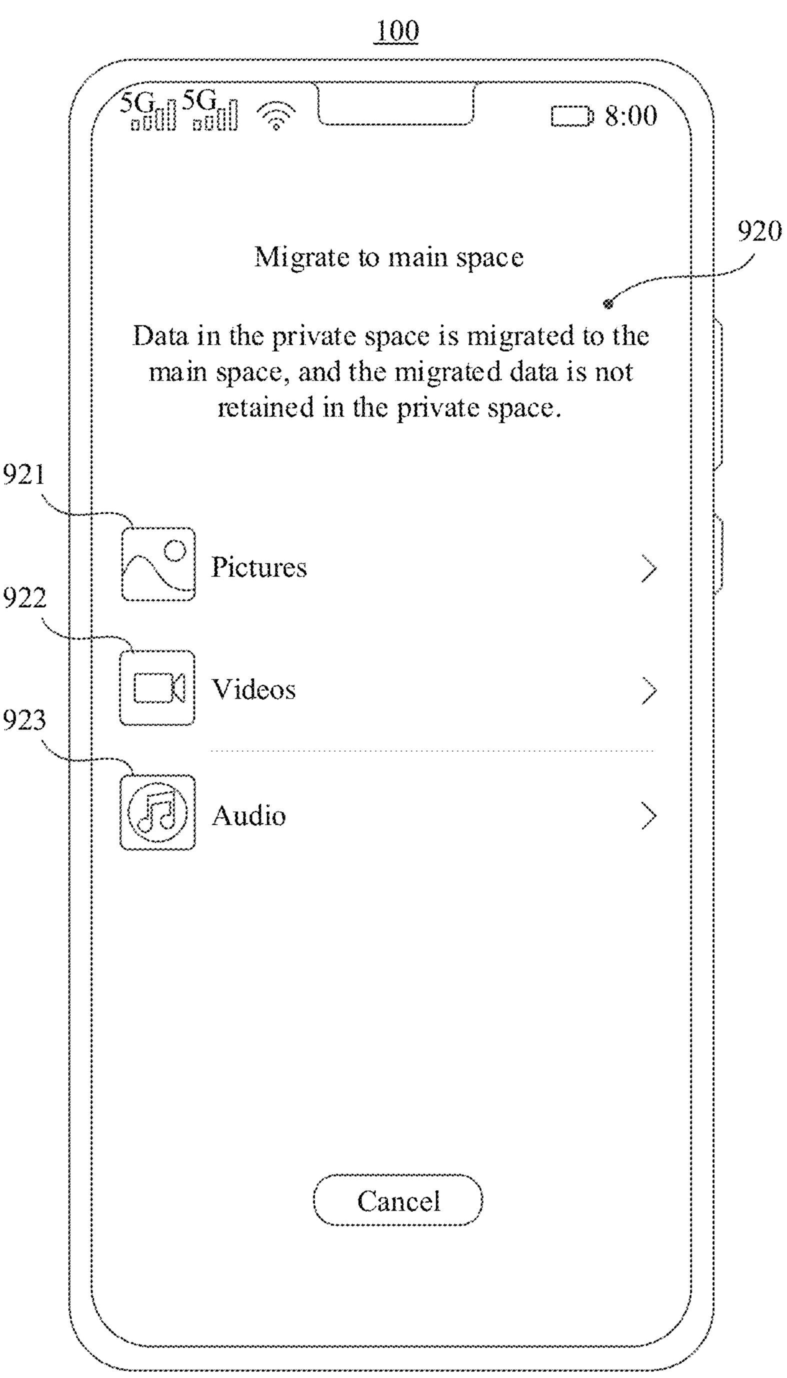

As shown in FIG. 9A, after the user taps the "private space to main space" option 512 in the private space management interface 510, the mobile phone 100 may display a "migrate to main space" operating interface 920 shown in FIG. 9B.

As shown in FIG. 9B, the "migrate to main space" operating interface 920 includes a picture 921, a video 922, and audio 923 that can be migrated. For example, if the user selects the picture 921, the mobile phone 100 may display a picture selection interface 930 shown in FIG. 9C.

Figure 9C:
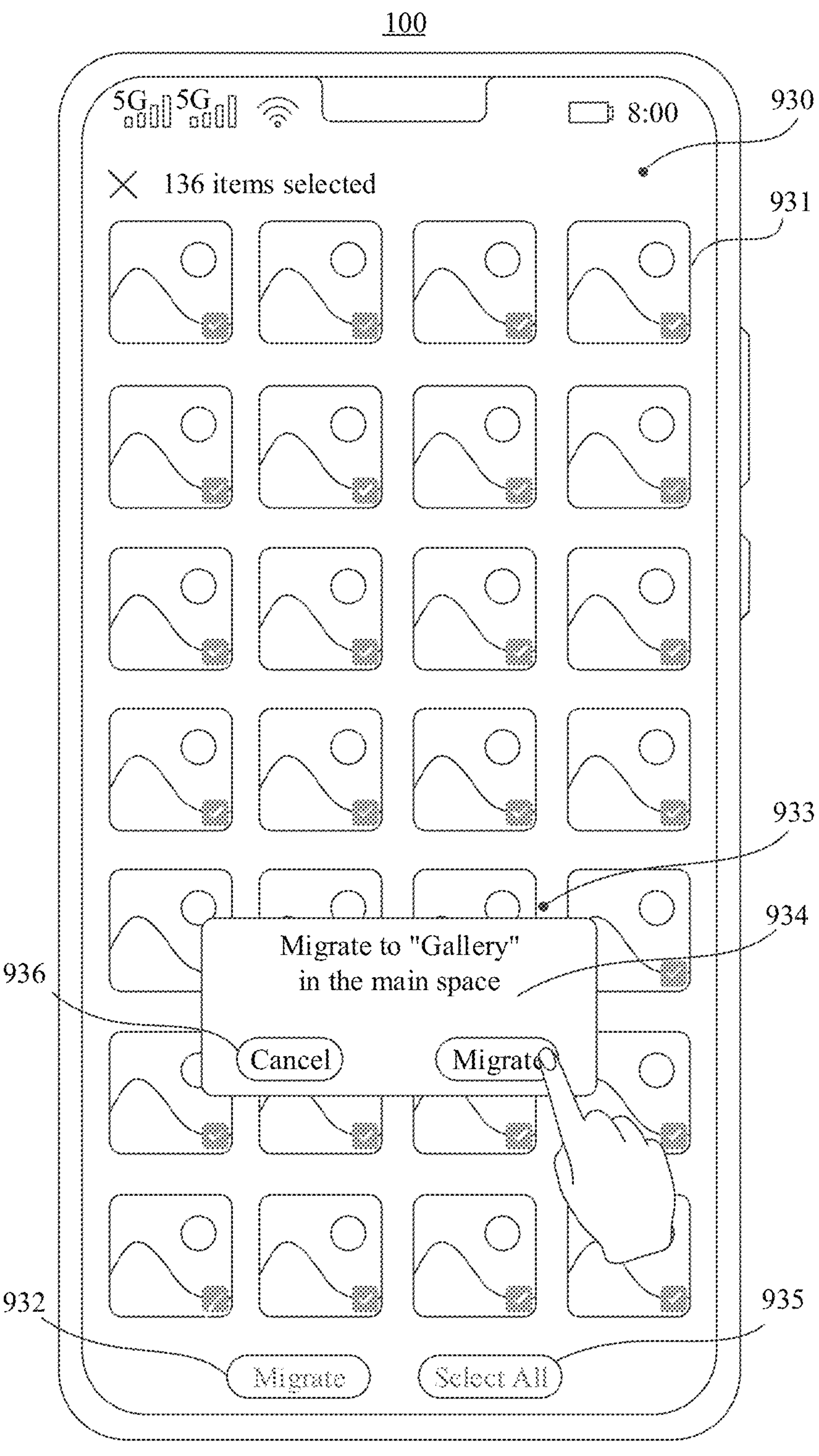
Figure 9D:
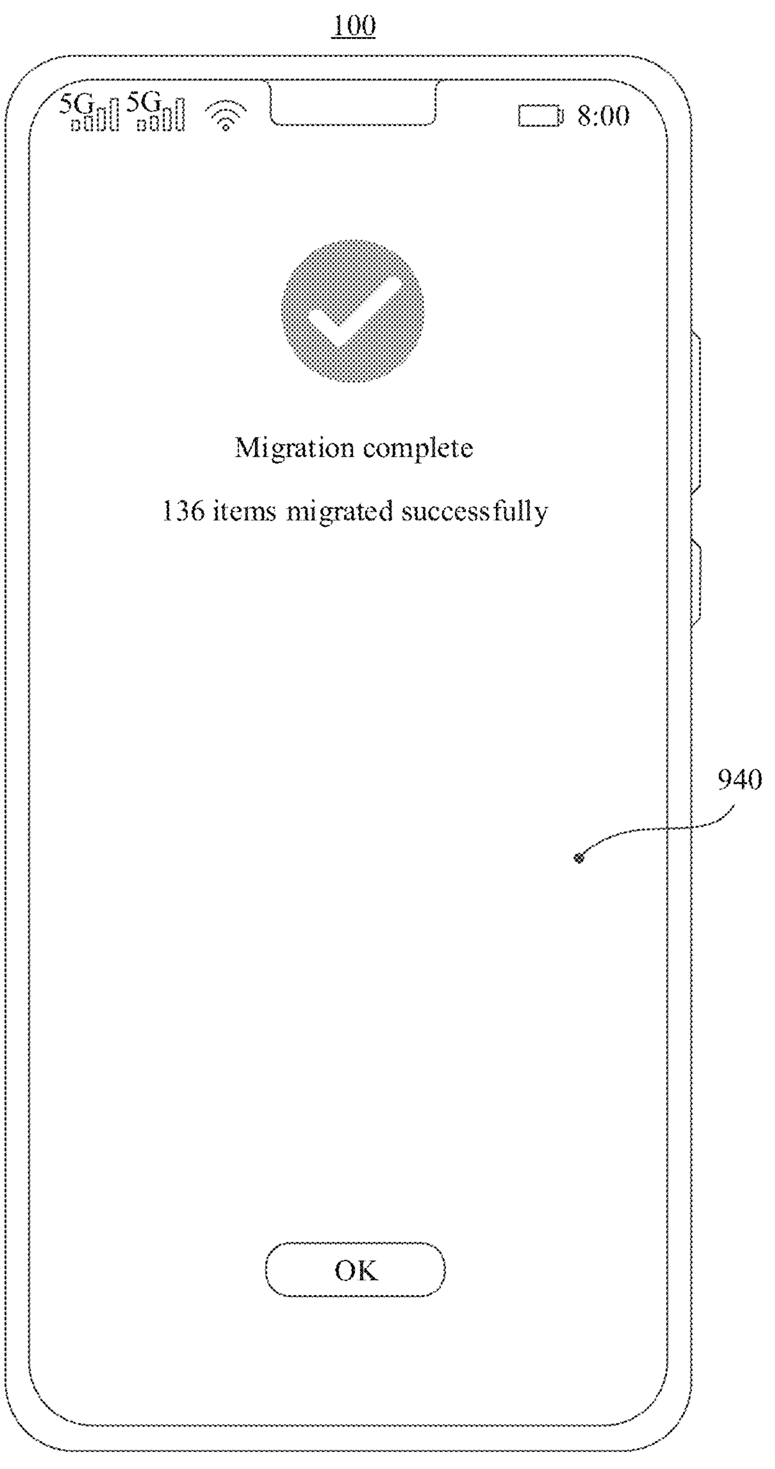

As shown in FIG. 9C, the user may select, in the picture selection interface 930, a picture (that is, a specified file) that needs to be migrated. A check mark 931 may be displayed in a lower right corner of the selected picture to indicate that the file is in a selected state. For a style of the check mark 531, refer to "√" shown in FIG. 9C. After selecting, in the picture selection interface 930, the picture that needs to be migrated, the user may tap a Migrate button 932. In this case, a migration confirmation box 933 shown in FIG. 9C may pop up on the mobile phone 100. The user may further tap an OK button 934 in the migration confirmation box 933 to complete migration of the selected picture file, and the mobile phone 100 may display a migration completion interface 940 shown in FIG. 9D. A quantity of files that need to be migrated and that are selected by the user may be further displayed in an upper left corner of the picture selection interface 930 shown in FIG. 9C, for example, "136 items selected" shown in FIG. 9C.

Still as shown in FIG. 9C, the user may alternatively tap an All button 935 in the picture selection interface 930 to select all pictures in the picture selection interface 930 (including pictures not displayed in the interface shown in FIG. 9C). Details are not described herein. In addition, in the migration confirmation box 933 displayed on the mobile phone 100 after the user taps the Migrate button 932 in FIG. 9C, the user may alternatively tap a Cancel button 936 to cancel the current migration operation.

Figure 9E:

After migration of the picture file selected by the user is completed by using the foregoing migration operation process shown in FIG. 9A to FIG. 9D, as shown in FIG. 9E. The user may tap a gallery application icon 951 on a home screen 950 of the main space to open a gallery application in the main space of the mobile phone 100, and the mobile phone 100 runs the gallery application and displays a gallery interface 960 shown in FIG. 9F.

Figure 9F:
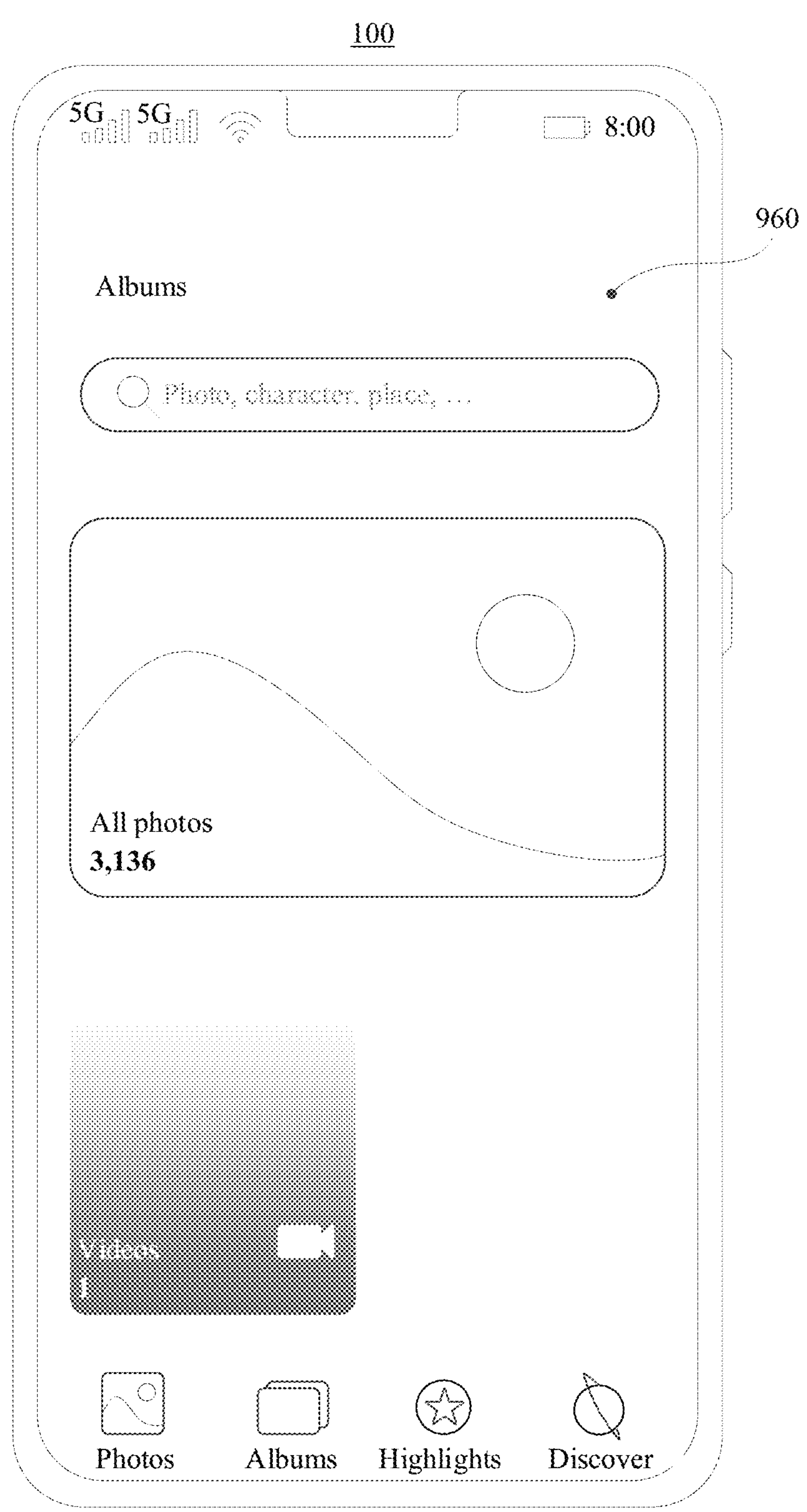

As shown in FIG. 9F, "All photos 3,136" displayed in the gallery interface 560 includes 136 pictures migrated from the private space to the main space by using the migration operations in FIG. 9A to FIG. 9D.

Figure 10:
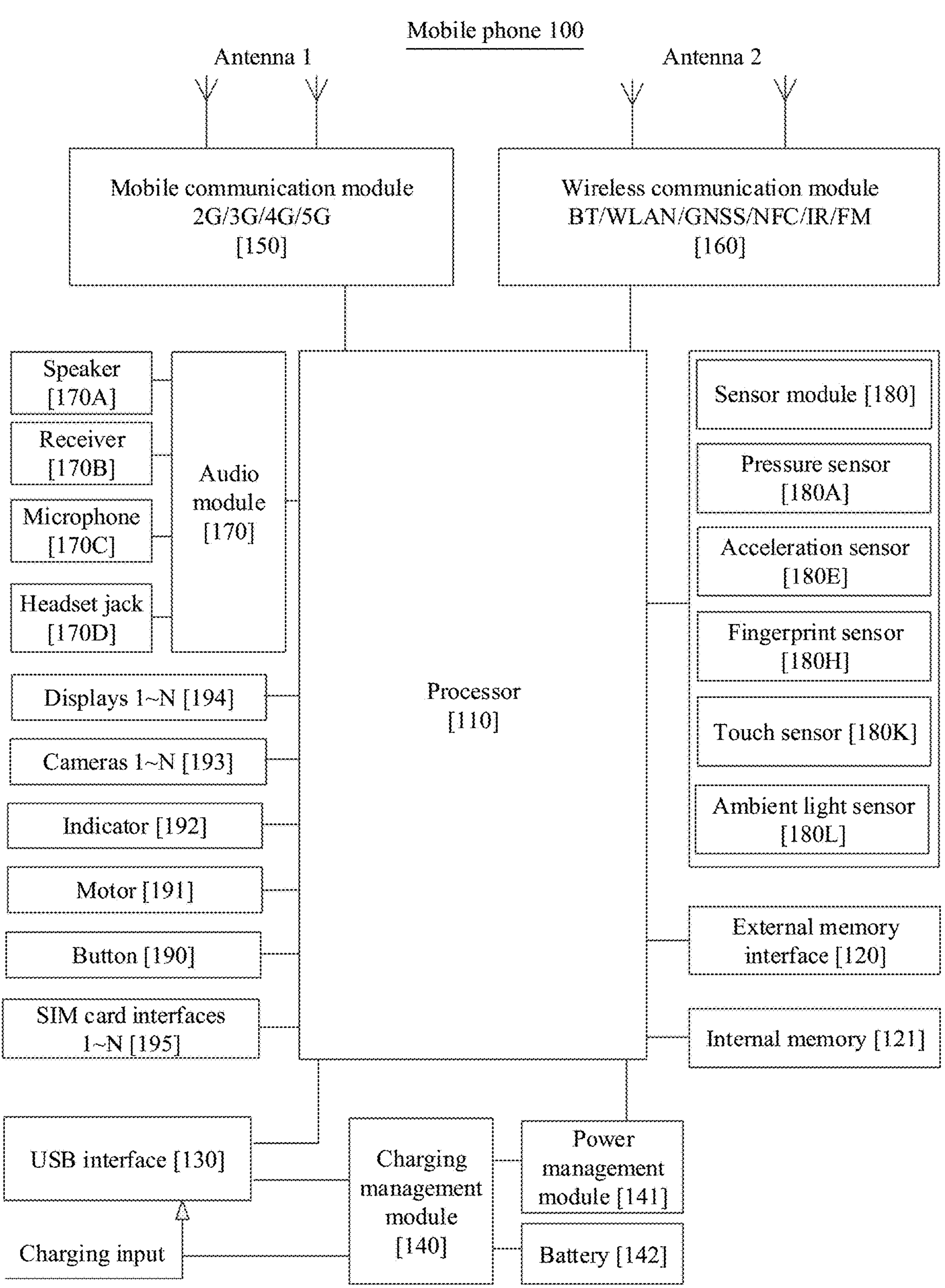
FIG. 10 is a schematic diagram of a structure of a mobile phone 100 according to an embodiment of this application.

FIG. 10 is a schematic diagram of a structure of a mobile phone 100 according to an embodiment of this application.

As shown in FIG. 10, the mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, an acceleration sensor 180E, a fingerprint sensor 180H, a touch sensor 180K, an ambient light sensor 180L, and the like.

It may be understood that the structure illustrated in this embodiment of this application does not constitute a specific limitation on the mobile phone 100. In some other embodiments of this application, the mobile phone 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a timing signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency. In this embodiment of this application, the processor 110 may invoke execution instructions stored in the memory that are used to implement the file migration method provided in this application, to implement the file migration method provided in the embodiments of this application.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface. MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (derial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call by using a Bluetooth headset.

The PCM interface may also be used for audio communication, to sample, quantize, and encode an analog signal. In some embodiments, the audio module 170 may be coupled to the wireless communication module 160 through a PCM bus interface. In some embodiments, the audio module 170 may also transfer an audio signal to the wireless communication module 160 through the PCM interface, to implement a function of answering a call by using a Bluetooth headset. Both the I2S interface and the PCM interface can be used for audio communication.

The UART interface is a universal serial data bus for asynchronous communication. The bus may be a bidirectional communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface, to implement a function of playing music by using a Bluetooth headset.

The MIPI interface may be configured to connect the processor 110 to peripheral devices such as the display 194 and the camera 193. The MIPI interface include a camera serial interface (camera serial interface, CSI), a display serial interface (display serial interface, DSI), and the like. In some embodiments, the processor 110 communicates with the camera 193 through the CSI interface, to implement a shooting function of the mobile phone 100. The processor 110 communicates with the display 194 through the DSI interface, to implement a display function of the mobile phone 100.

The GPIO interface may be configured by software. The GPIO interface may be configured as a control signal or may be configured as a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that complies with USB standard specifications, and may be specifically a Mini USB interface, a Micro USB interface, a USB Type C interface, or the like. The USB interface 130 may be configured to connect to a charger to charge the mobile phone 100, or may be used for data transmission between the mobile phone 100 and a peripheral device, or may be configured to connect to a headset to play audio by using the headset. The interface may alternatively be configured to connect to another electronic device, for example, an AR device.

It may be understood that an interface connection relationship between the modules illustrated in this embodiment of this application is merely an example for description, and does not constitute a limitation on the structure of the mobile phone 100. In some other embodiments of this application, the mobile phone 100 may alternatively use an interface connection manner different from that in the foregoing embodiment or use a combination of a plurality of interface connection manners.

The charging management module 140 is configured to receive a charging input from a charger. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, to supply power to the processor 110, the internal memory 121, the display 194, the camera 193, the wireless communication module 160, and the like.

A wireless communication function of the mobile phone 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals.

The mobile communication module 150 may provide a solution for wireless communication including 2G/3G/4G/5G and the like applied to the mobile phone 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send a processed electromagnetic wave to the modem processor for demodulation. The mobile communication module 150 may further amplify a signal obtained after modulation by the modem processor, and convert an amplified signal into an electromagnetic wave for radiation by using the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The wireless communication module 160 may provide a solution for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the mobile phone 100. The wireless communication module 160 may be one or more devices integrating at least one communication processing module. The wireless communication module 160 receives an electromagnetic wave by using the antenna 2. performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

The mobile phone 100 implements a display function by using the GPU, the display 194, the application processor, and the like. The GPU is a microprocessor for image processing, and is connected to the display 194 and the application processor. The GPU is configured to perform mathematical and geometric calculation for graphics rendering. The processor 110 may include one or more GPUs that execute program instructions to generate or change displayed information.

The display 194 is configured to display an image, a video, or the like. The display 194 includes a display panel. The display panel may be a liquid crystal display (liquid crystal display; LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a Mini-LED, a Micro-LED, a Micro-OLED, a quantum dot light emitting diode (quantum dot light emitting diodes, QLED), and the like. In some embodiments, the mobile phone 100 may include one or N displays 194, where N is a positive integer greater than 1.

The camera 193 is configured to capture a still image or a video. An optical image is generated for an object through a lens and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the mobile phone 100 may include one or N cameras 193, where N is a positive integer greater than 1.

The external memory interface 120 may be configured to connect to an external storage card such as a Micro SD card, to extend a storage capability of the mobile phone 100. The external storage card communicates with the processor 110 through the external memory interface 120, to implement a data storage function. For example, files such as music and videos are stored in the external storage card.

The internal memory 121 may be configured to store computer-executable program code, and the executable program code includes instructions. The internal memory 121 may include a program storage area and a data storage area. The program storage area may store an operating system, an application required by at least one function (for example, a sound playing function or an image playing function), and the like. The data storage area may store data (for example, audio data or a phone book) and the like created during use of the mobile phone 100. In addition, the internal memory 121 may include a high-speed random access memory, and may further include a nonvolatile memory, for example, at least one disk storage device, a flash memory device, or a universal flash storage (universal flash storage, UFS). The processor 110 performs various function applications and data processing of the mobile phone 100 by running the instructions stored in the internal memory 121 and/or the instructions stored in the memory disposed in the processor.

The mobile phone 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mic" or "mike", is configured to convert a sound signal into an electrical signal.

The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates having an electrically conductive material. When force is applied to the pressure sensor 180A, capacitance between electrodes changes. The mobile phone 100 determines strength of pressure based on a change of the capacitance. When a touch operation is performed on the display 194, the mobile phone 100 detects strength of the touch operation by using the pressure sensor 180A. The mobile phone 100 may also calculate a touch location based on a detected signal of the pressure sensor 180A. In some embodiments, touch operations performed at a same touch location but having different touch operation strength may correspond to different operation instructions. For example, when a touch operation whose touch operation strength is less than a first pressure threshold is performed on a Messages application icon, an instruction for viewing an SMS message is executed. When a touch operation whose touch operation strength is greater than or equal to the first pressure threshold is performed on the Messages application icon, an instruction for creating a new SMS message is executed.

The acceleration sensor 180E may detect magnitudes of acceleration of the mobile phone 100 in all directions (generally in three axes), and may detect a magnitude and a direction of gravity when the mobile phone 100 is still. The acceleration sensor 180E may be further configured to recognize a posture of the electronic device, and is applied to applications such as switching between a landscape mode and a portrait mode and a pedometer.

The ambient light sensor 180L is configured to sense brightness of ambient light. The mobile phone 100 may adaptively adjust brightness of the display 194 based on the sensed brightness of the ambient light. The ambient light sensor 180L may also be configured to automatically adjust white balance during photographing. The ambient light sensor 180L may further cooperate with an optical proximity sensor 180G to detect whether the mobile phone 100 is in a pocket to prevent an accidental touch.

The fingerprint sensor 180H is configured to collect a fingerprint. The mobile phone 100 may implement fingerprint-based unlocking, application lock accessing, fingerprint-based photographing, fingerprint-based call answering, and the like by using a feature of the collected fingerprint. In the embodiments of this application, different unlocking fingerprints may be used for the main space and the private space to perform verification login, so as to ensure security of private data in the private space. A user may verify, on the mobile phone 100, different fingerprints to respectively enter the main space and the private space.

The touch sensor 180K is also referred to as a "touch device". The touch sensor 180K may be disposed on the display 194. The touch sensor 180K and the display 194 form a touchscreen, also referred to as a "touch control screen". The touch sensor 180K is configured to detect a touch operation performed on or near the touch sensor 180K. The touch sensor can transmit a detected touch operation to the application processor to determine a type of a touch event. A visual output related to the touch operation may be provided by using the display 194. In some other embodiments, the touch sensor 180K may alternatively be disposed on a surface of the mobile phone 100, and is at a location different from that of the display 194.

The button 190 includes a power on/off button, a volume button, and the like. The button 190 may be a mechanical button, or may be a touch button. The mobile phone 100 may receive a key input, and generate a key signal input related to user settings and function control of the mobile phone 100.

The motor 191 may generate a vibration prompt.

The indicator 192 may be an indicator light, may be configured to indicate a charging status or a power change, and may be further configured to indicate a message, a missed incoming call, a notification, and the like.

The SIM card interface 195 is configured to connect to a SIM card.

It may be understood that, a reference to "an embodiment" or "embodiments" in the specification means that specific features, structures, or characteristics described with reference to the embodiment is included in at least one example implementation solution or technology disclosed according to this application. The phrase "in an embodiment" appearing in parts of the specification does not necessarily refer to a same embodiment.

Disclosure in this application further relates to an apparatus configured to perform operations in the text. The apparatus may be specially constructed for a required purpose, or may include a general-purpose computer that is selectively activated or reconfigured by a computer program stored in the computer. Such a computer program may be stored in a computer-readable medium, for example, but is not limited to any type of disk, including a floppy disk, an optical disc, a CD-ROM, a magneto-optical disk, a read-only memory (ROM), a random access memory (RAM), an EPROM, an EEPROM, a magnetic or optical card, an application-specific integrated circuit (ASIC), or any type of medium suitable for storing electronic instructions, and each of the disks may be coupled to a computer system bus. In addition, the computer mentioned in the specification may include a single processor or may be an architecture related to a plurality of processors with an increased computing capability.

In addition, the language used in the specification has been primarily selected for readability and guidance purposes and may not be selected to describe or limit the disclosed subject matter. Therefore, disclosure in this application is intended to describe rather than limit the scope of the concept discussed in this specification.

What is claimed is:

1. A file migration method, applied to an electronic device, wherein a main space, a private space, and a first application are disposed on the electronic device, a filesystem of the electronic device is a filesystem in user space, and the method comprises:

receiving a first access request of the first application for a first-type file in the main space, wherein a space running the first application is the private space, and the first-type file comprises one of a picture, a video, audio, or a contact;

when determining that the first application has a read permission on the first-type file in the main space, redirecting, in response to the first access request, a content provider corresponding to the first-type file from a second content provider in the private space to a first content provider in the main space, wherein the first content provider is used by the first application to obtain the first-type file, wherein the redirecting comprises;

querying an identity document of a main space user from an Activity manager service;

returning the identity document of the main space user; and obtaining the first content provider based on the identity document of the main space user;

receiving a first migration request of the first application for a first specified file in the first-type file in the main space, wherein the first migration request is used to request to migrate the first specified file from the main space to the private space; and in response to the first migration request, migrating the first specified file from the main space to the private space when determining that the first application has a read and write permission on the first-type file in the main space, wherein the first application is a file migration service configured for migrating files between the main space and the private space.

2. The method according to claim 1, wherein the first migration request comprises a first file path and a second file path, the first file path is a path for obtaining the first specified file, and the second file path is a path for writing the first specified file; and the first file path points to the main space, and the second file path points to the private space.

3. The method according to claim 2, wherein the first content provider is configured to provide the first file path.

4. The method according to claim 3, wherein the migrating the first specified file from the main space to the private space comprises:

obtaining the first specified file from the main space based on the first file path; and writing the obtained first specified file into the private space based on the second file path.

5. The method according to claim 1, wherein the method further comprises: when determining that the first application has no read and write permission on the first-type file, returning information of an identity of a private space user in response to the first migration request; and obtaining the second content provider based on the information of the identity of the private space user, wherein the second content provider cannot provide a path for accessing the first specified file.

6. The method according to claim 1, wherein the method further comprises:

receiving a second migration request of the first application for a second specified file in the private space, wherein the second migration request is used to request to migrate the second specified file from the private space to the main space, the space running the first application is the private space, and a type of the second specified file comprises any one of a picture, a video, audio, and a contact; and when determining that the first application has a read and write permission on the second specified file, in response to the second migration request, redirecting a content provider corresponding to the second specified file from a fourth content provider in the private space to a third content provider in the main space, wherein the third content provider is used by the first application to write the second specified file into the main space, to migrate the second specified file from the private space to the main space.

7. The method according to claim 6, wherein the second migration request comprises a third file path and a fourth file path, the third file path is a path for accessing the second specified file, and the fourth file path is a path for writing the second specified file; and the third file path points to the private space, and the fourth file path points to the main space.

8. The method according to claim 7, wherein the redirecting a content provider corresponding to the second specified file from a fourth content provider in the private space to a third content provider in the main space comprises:

returning information of an identity of a main space user in response to the second migration request; and obtaining the third content provider based on the information of the identity of the main space user, wherein the third content provider is configured to provide the fourth file path.

9. The method according to claim 8, wherein the migrating the second specified file from the private space to the main space comprises:

obtaining the second specified file from the private space based on the third file path; and writing the obtained second specified file into the main space based on the fourth file path.

10. An electronic device, wherein a main space, a private space, and a first application are disposed on the electronic device, a filesystem of the electronic device is a filesystem in user space, and the electronic device comprising:

one or more processors and one or more memories, wherein the one or more memories store one or more programs, and when the one or more programs are executed by the one or more processors, the electronic device is enabled to perform the following steps:

receiving a first access request of the first application for a first-type file in the main space, wherein a space running the first application is the private space, and the first-type file comprises any one of a picture, a video, audio, and a contact;

when determining that the first application has a read permission on the first-type file in the main space, redirecting, in response to the first access request, a content provider corresponding to the first-type file from a second content provider in the private space to a first content provider in the main space, wherein the first content provider is used by the first application to obtain the first-type file, wherein the redirecting comprises:

querying an identity document of a main space user from an Activity manager service;

returning the identity document of the main space user; and obtaining the first content provider based on the identity document of the main space user;

receiving a first migration request of the first application for a first specified file in the first-type file in the main space, wherein the first migration request is used to request to migrate the first specified file from the main space to the private space; and in response to the first migration request, migrating the first specified file from the main space to the private space when determining that the first application has a read and write permission on the first-type file in the main space, wherein the first application is a file migration service configured for migrating files between the main space and the private space.

11. The electronic device according to claim 10, wherein the first migration request comprises a first file path and a second file path, the first file path is a path for obtaining the first specified file, and the second file path is a path for writing the first specified file; and the first file path points to the main space, and the second file path points to the private space.

12. The electronic device according to claim 11, wherein the first content provider is configured to provide the first file path.

13. The electronic device according to claim 12, wherein the migrating the first specified file from the main space to the private space comprises:

obtaining the first specified file from the main space based on the first file path; and writing the obtained first specified file into the private space based on the second file path.

14. The electronic device according to claim 10, wherein the steps further comprise: when determining that the first application has no read and write permission on the first-type file, returning information of an identity of a private space user in response to the first migration request; and obtaining the second content provider based on the information of the identity of the private space user, wherein the second content provider cannot provide a path for accessing the first specified file.

15. The electronic device according to claim 10, wherein the steps further comprise:

receiving a second migration request of the first application for a second specified file in the private space, wherein the second migration request is used to request to migrate the second specified file from the private space to the main space, the space running the first application is the private space, and a type of the second specified file comprises any one of a picture, a video, audio, and a contact; and when determining that the first application has a read and write permission on the second specified file, in response to the second migration request, redirecting a content provider corresponding to the second specified file from a fourth content provider in the private space to a third content provider in the main space, wherein the third content provider is used by the first application to write the second specified file into the main space, to migrate the second specified file from the private space to the main space.

16. The electronic device according to claim 15, wherein the second migration request comprises a third file path and a fourth file path, the third file path is a path for accessing the second specified file, and the fourth file path is a path for writing the second specified file; and the third file path points to the private space, and the fourth file path points to the main space.

17. The electronic device according to claim 16, wherein the redirecting a content provider corresponding to the second specified file from a fourth content provider in the private space to a third content provider in the main space comprises:

returning information of an identity of a main space user in response to the second migration request; and obtaining the third content provider based on the information of the identity of the main space user, wherein the third content provider is configured to provide the fourth file path.

18. The electronic device according to claim 17, wherein the migrating the second specified file from the private space to the main space comprises:

obtaining the second specified file from the private space based on the third file path; and writing the obtained second specified file into the main space based on the fourth file path.

19. The electronic device according to claim 10, wherein when the first application is a file migration service, it is determined that the first application has the read and write permission on the first-type file in the main space; or when the first application is a file migration service, it is determined that the first application has the read and write permission on the second specified file.

20. A non-transitory computer-readable storage medium, wherein the storage medium stores instructions, and when the instructions are executed on a computer, the computer is enabled to perform the following steps:

receiving a first access request of a first application for a first-type file in a main space, wherein a space running the first application is a private space, and the first-type file comprises any one of a picture, a video, audio, and a contact;

when determining that the first application has a read permission on the first-type file in the main space, redirecting, in response to the first access request, a content provider corresponding to the first-type file from a second content provider in the private space to a first content provider in the main space, wherein the first content provider is used by the first application to obtain the first-type file, wherein the redirecting comprises:

querying an identity document of a main space user from an Activity manager service;

returning the identity document of the main space user; and obtaining the first content provider based on the identity document of the main space user;

receiving a first migration request of the first application for a first specified file in the first-type file in the main space, wherein the first migration request is used to request to migrate the first specified file from the main space to the private space; and in response to the first migration request, migrating the first specified file from the main space to the private space when determining that the first application has a read and write permission on the first-type file in the main space, wherein the first application is a file migration service configured for migrating files between the main space and the private space.

* * * * *